(12) United States Patent
Schmidt et al.

(10) Patent No.: US 6,746,067 B2
(45) Date of Patent: Jun. 8, 2004

(54) CONTROL PANEL FOR A VEHICLE

(75) Inventors: Robert Schmidt, Livonia, MI (US);
Vicki Mabee, Royal Oak, MI (US);
Norman Becker, East China Township, MI (US); Aaron S. Deneweth, Chesterfield, MI (US); Jeffery K. Wiersing, Walled Lake, MI (US); Mark G. Feldman, Farmington Hills, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/234,631

(22) Filed: Sep. 4, 2002

(65) Prior Publication Data

US 2003/0052514 A1 Mar. 20, 2003

Related U.S. Application Data

(60) Provisional application No. 60/317,170, filed on Sep. 4, 2001.

(51) Int. Cl.$^7$ ................................................ B60R 11/02
(52) U.S. Cl. .................. 296/37.13; 296/164.7; 296/153; 296/24.34; 180/326; 180/334
(58) Field of Search .............................. 296/37.1, 37.8, 296/37.12, 37.13, 146.1, 146.7, 153, 24.3, 24.33, 24.34; 180/315, 334, 326

(56) References Cited

U.S. PATENT DOCUMENTS

| 1,911,582 A | * | 5/1933 | Nelson |
| 2,299,249 A | | 10/1942 | Obergfell |
| 4,083,589 A | | 4/1978 | Palmerino |
| 4,165,898 A | | 8/1979 | Janz et al. |
| 4,190,284 A | | 2/1980 | Schmidhuber et al. |
| 4,423,812 A | * | 1/1984 | Sato ............... 206/387 |
| 4,453,760 A | | 6/1984 | Hira |
| 4,473,724 A | | 9/1984 | Suzuki |
| 4,678,872 A | | 7/1987 | Gutman |
| 5,072,983 A | | 12/1991 | Muroi et al. |
| 5,116,099 A | | 5/1992 | Kwasnik et al. |
| 5,269,397 A | | 12/1993 | Kawamoto et al. |
| 5,278,363 A | | 1/1994 | Krieg et al. |
| 5,286,078 A | | 2/1994 | Mottino et al. |
| 5,294,758 A | | 3/1994 | Frankhouse et al. |
| 5,375,894 A | | 12/1994 | Schlack |
| 5,403,058 A | | 4/1995 | Fischer |
| 5,484,176 A | | 1/1996 | Sallwasser |
| 5,522,638 A | | 6/1996 | Falcoff et al. |
| 5,557,080 A | | 9/1996 | Hayakawa |
| 5,625,533 A | | 4/1997 | Kim et al. |
| 5,668,357 A | | 9/1997 | Takiguchi et al. |

(List continued on next page.)

FOREIGN PATENT DOCUMENTS

| DE | 34 45 891 | 6/1986 |
| DE | 36 26 512 | 2/1988 |
| DE | 37 19 105 | 12/1988 |
| DE | 101 22 454 | 11/2001 |
| EP | 0 084 107 | 7/1983 |
| EP | 0 114 959 | 8/1984 |
| FR | 2 391 871 | 5/1978 |
| FR | 2 391 681 | 12/1978 |
| WO | 90/09127 | 8/1990 |

Primary Examiner—D. Glenn Dayoan
Assistant Examiner—Hilary L Gutman
(74) Attorney, Agent, or Firm—Bill C. Panagos

(57) ABSTRACT

This invention relates to a control panel for a vehicle interior. The control panel includes a housing defining a recess formed therein. A panel is movably attached to the housing, such as by a pivot. The panel has at least one control mechanism mounted thereon. The panel is movable between first and second positions. In the first position, the panel generally covers at least a portion of the recess. In the second position, the panel generally exposes the recess. Preferably, the housing defines a first surface within the recess, and a second control mechanism is mounted on the first surface.

11 Claims, 28 Drawing Sheets

U.S. PATENT DOCUMENTS

| | | |
|---|---|---|
| 5,887,669 A | 3/1999 | Ostler et al. |
| 5,887,930 A | 3/1999 | Klein |
| 5,893,478 A | 4/1999 | Maruoka |
| 5,921,610 A | 7/1999 | Grimes |
| 5,924,515 A | 7/1999 | Stauffer |
| 5,952,630 A | 9/1999 | Filion et al. |
| 6,003,925 A | 12/1999 | Litke et al. |
| 6,086,129 A | 7/2000 | Gray |
| 6,116,672 A | 9/2000 | Cannon et al. |
| 6,125,030 A | 9/2000 | Mola et al. |
| 6,126,221 A | 10/2000 | Kern |
| 6,158,795 A | 12/2000 | Gray et al. |
| 6,176,534 B1 | 1/2001 | Duncan |
| 6,216,930 B1 | 4/2001 | Plocher et al. |
| 6,244,647 B1 | 6/2001 | Allison |
| 6,254,162 B1 | 7/2001 | Faber et al. |
| 6,352,295 B1 | 3/2002 | Leitner |
| 6,405,486 B1 * | 6/2002 | Rogers, Jr. et al. ...... 296/146.1 |
| 6,536,825 B2 | 3/2003 | McAndrew et al. |
| 6,629,716 B2 * | 10/2003 | Shibata et al. ............. 296/37.8 |

* cited by examiner

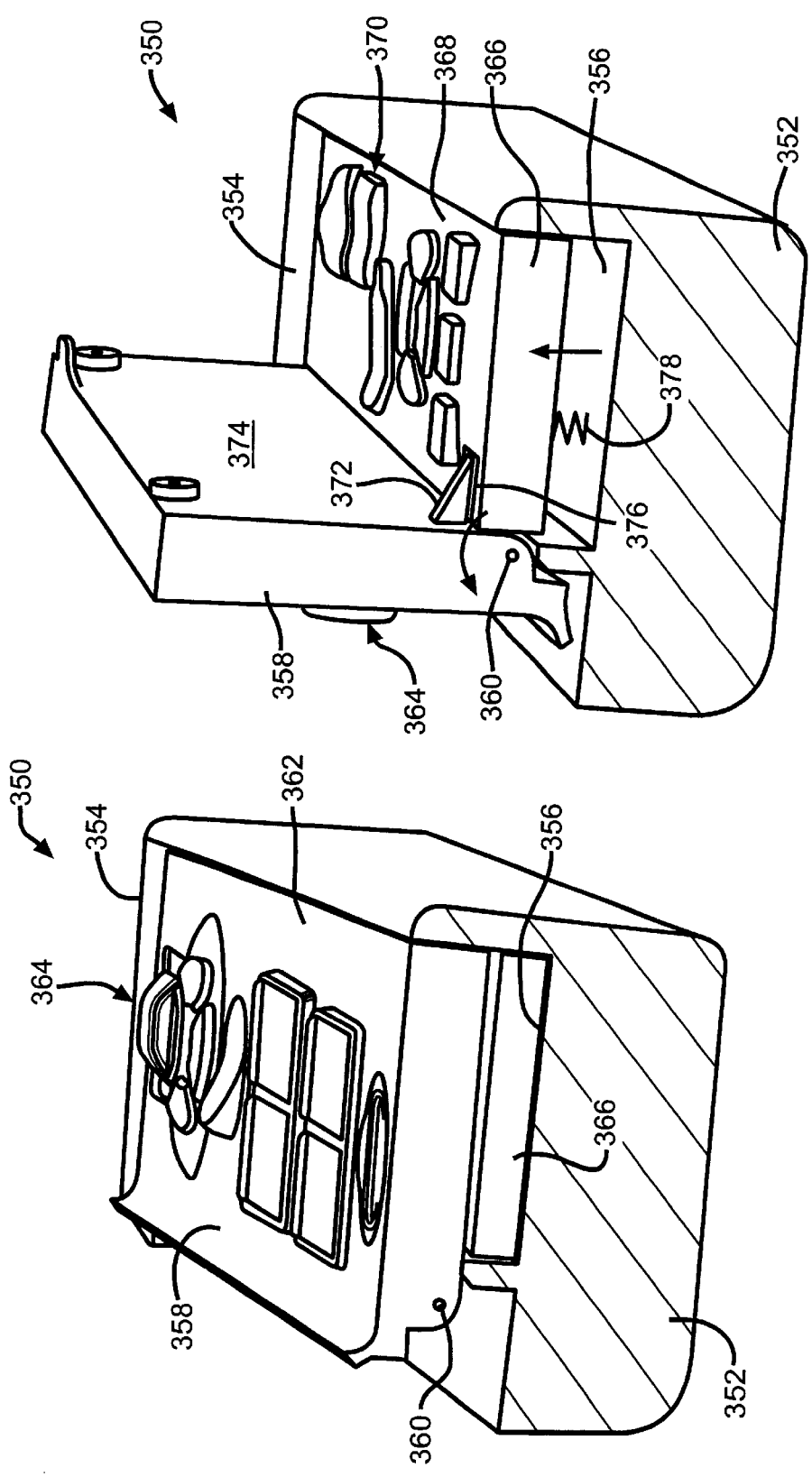

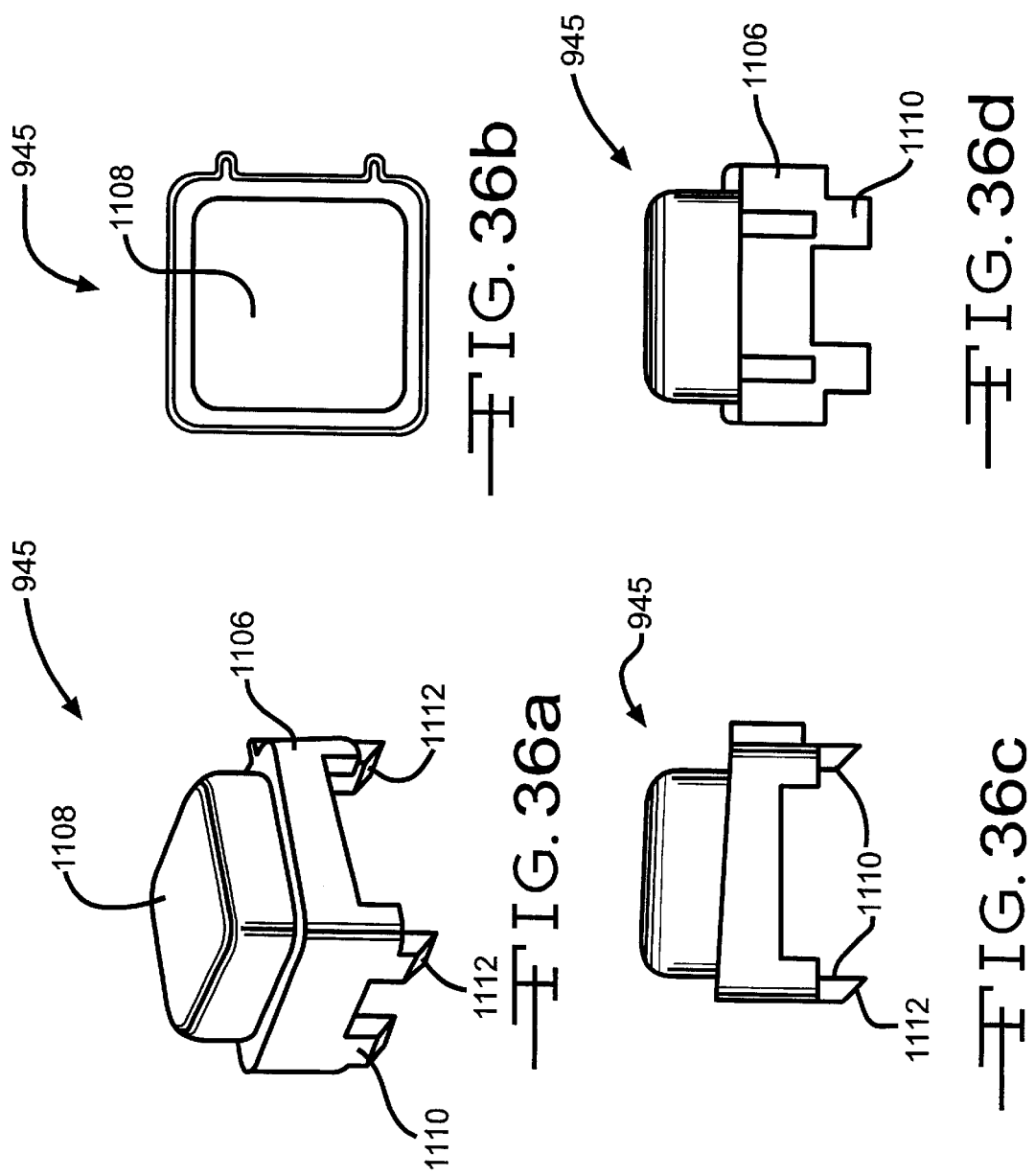

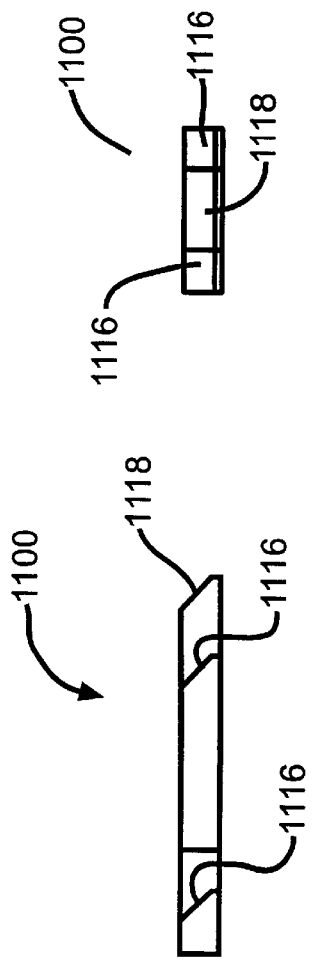
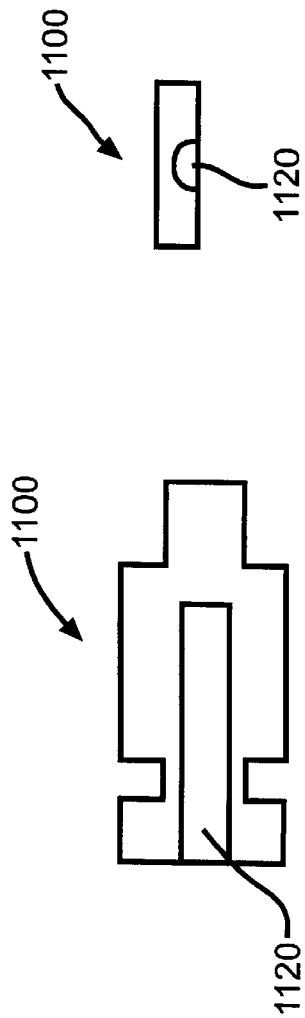
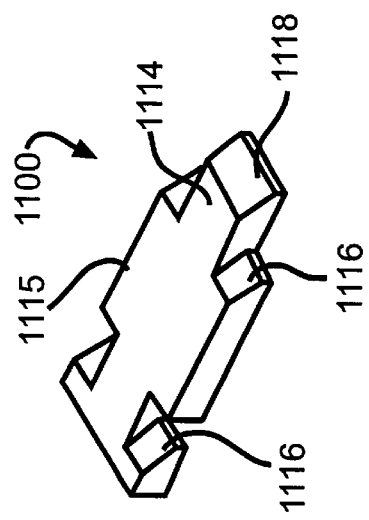
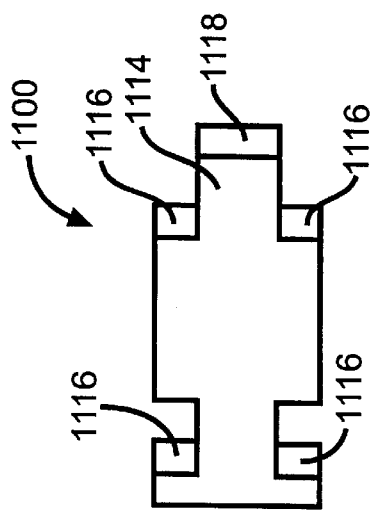
FIG. 37a
FIG. 37b
FIG. 37c
FIG. 37d
FIG. 37e
FIG. 37f

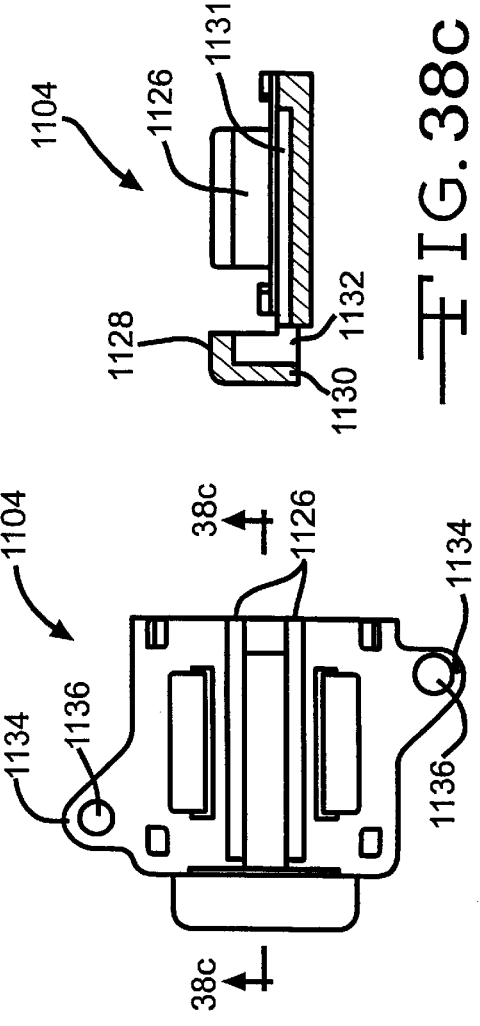

CONTROL PANEL FOR A VEHICLE

CROSS REFERENCE TO RELATED APPLICATIONS

This application claims the benefit of U.S. Provisional Application No. 60/317,170 filed Sep. 4, 2001.

BACKGROUND OF THE INVENTION

This invention relates in general to electrical control panels for vehicles. Most all passenger vehicles are equipped with electrical components which are controllable by the occupants of the vehicle. The electrical components are controlled by the manual manipulation of control mechanisms, such as switches and rotary devices. The control mechanisms are mounted on various panels within the interior of the vehicle, such as the instrument panel, door panels, seats, center consoles, and overhead consoles. It is becoming increasingly more common to replace manually actuated components with electrically actuated components, such as for example, seat adjustment mechanisms, mirror adjustment mechanisms, door locks, window lifting devices, pedal adjustment mechanisms, and steering column adjustment mechanisms. Because of the increase in number of control mechanisms, the various areas surrounding the occupants, namely the driver of the vehicle, is becoming over crowded and sometimes confusing. The increased amount of control mechanisms also leads to the placement of some of the control mechanisms at undesirable locations where they might be difficult or cumbersome to reach.

SUMMARY OF THE INVENTION

This invention relates to a control panel for a vehicle interior. The control panel includes a housing defining a recess formed therein. A panel is movably attached to the housing, such as by a pivot. The panel has at least one control mechanism mounted thereon. The panel is movable between first and second positions. In the first position, the panel generally covers at least a portion of the recess. In the second position, the panel generally exposes the recess. Preferably, the housing defines a first surface within the recess, and a second control mechanism is mounted on the first surface.

Various objects and advantages of this invention will become apparent to those skilled in the art from the following detailed description of the preferred embodiment, when read in light of the accompanying drawings.

BRIEF DESCRIPTION OF THE DRAWINGS

FIG. 18 is a perspective view of an alternate embodiment of a control panel, wherein first and second panels are shown in their first positions.

FIG. 19 is a perspective view of the control panel of FIG. 18, wherein the panels are shown in their second positions.

FIGS. 36a through 36d are, respectively, the perspective, plan, side elevation and front elevation views of the actuating member of the latch release mechanism of FIG. 34.

FIGS. 37a through 37f are, respectively, perspective, side elevation, front elevation, plan, bottom plan, and rear elevation views of the latch cam member of the latch release mechanism of FIG. 34.

FIGS. 38a through 38e are, respectively, perspective, plan, sectional, front elevation, and side elevation views of the latch cam base of the latch release mechanism of FIG. 34.

DESCRIPTION OF THE INVENTION

Figure 1:
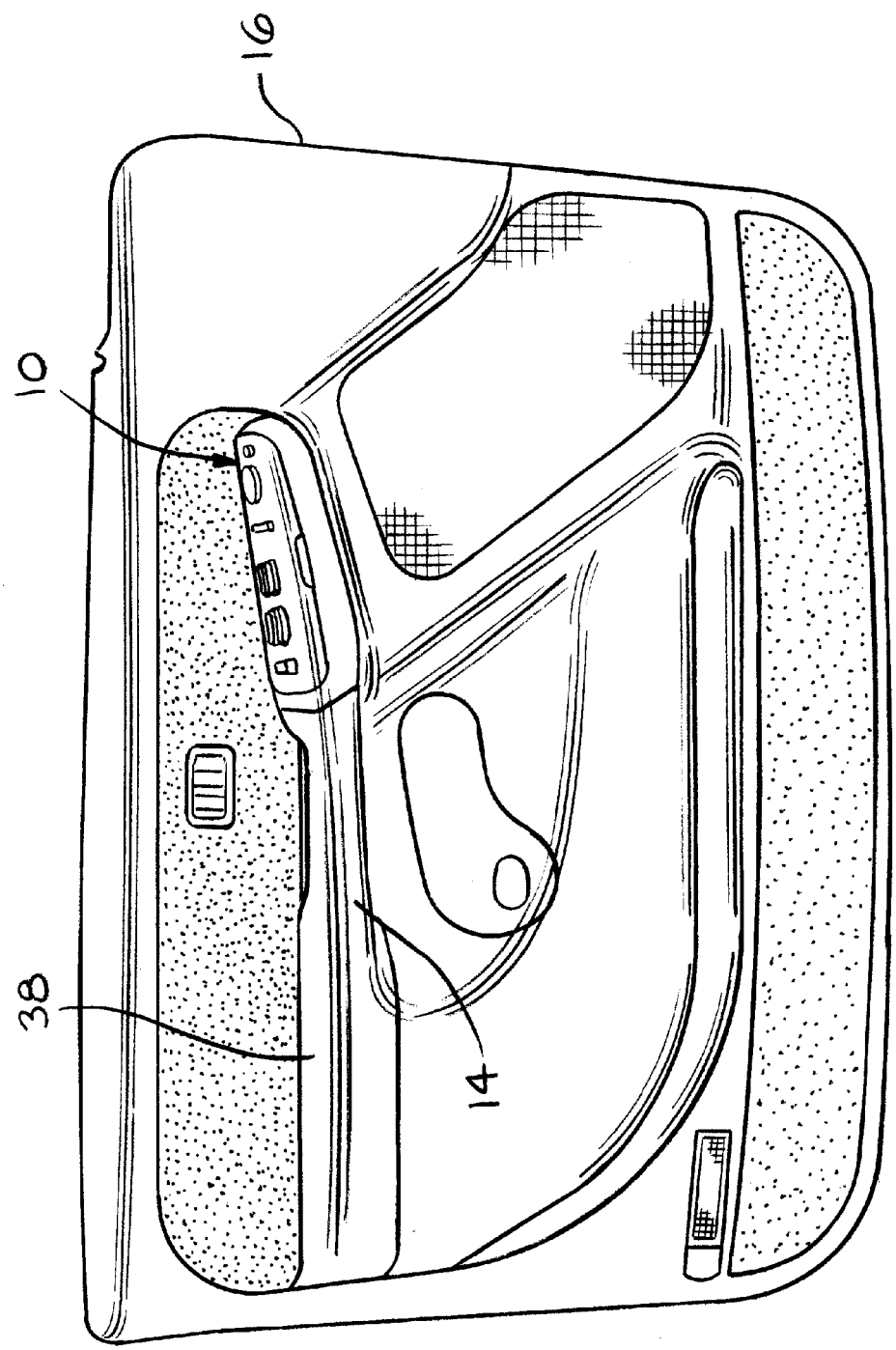
FIG. 1 is a side elevational view of a vehicle door panel having the control panel of the present invention mounted thereon.
Figure 2:
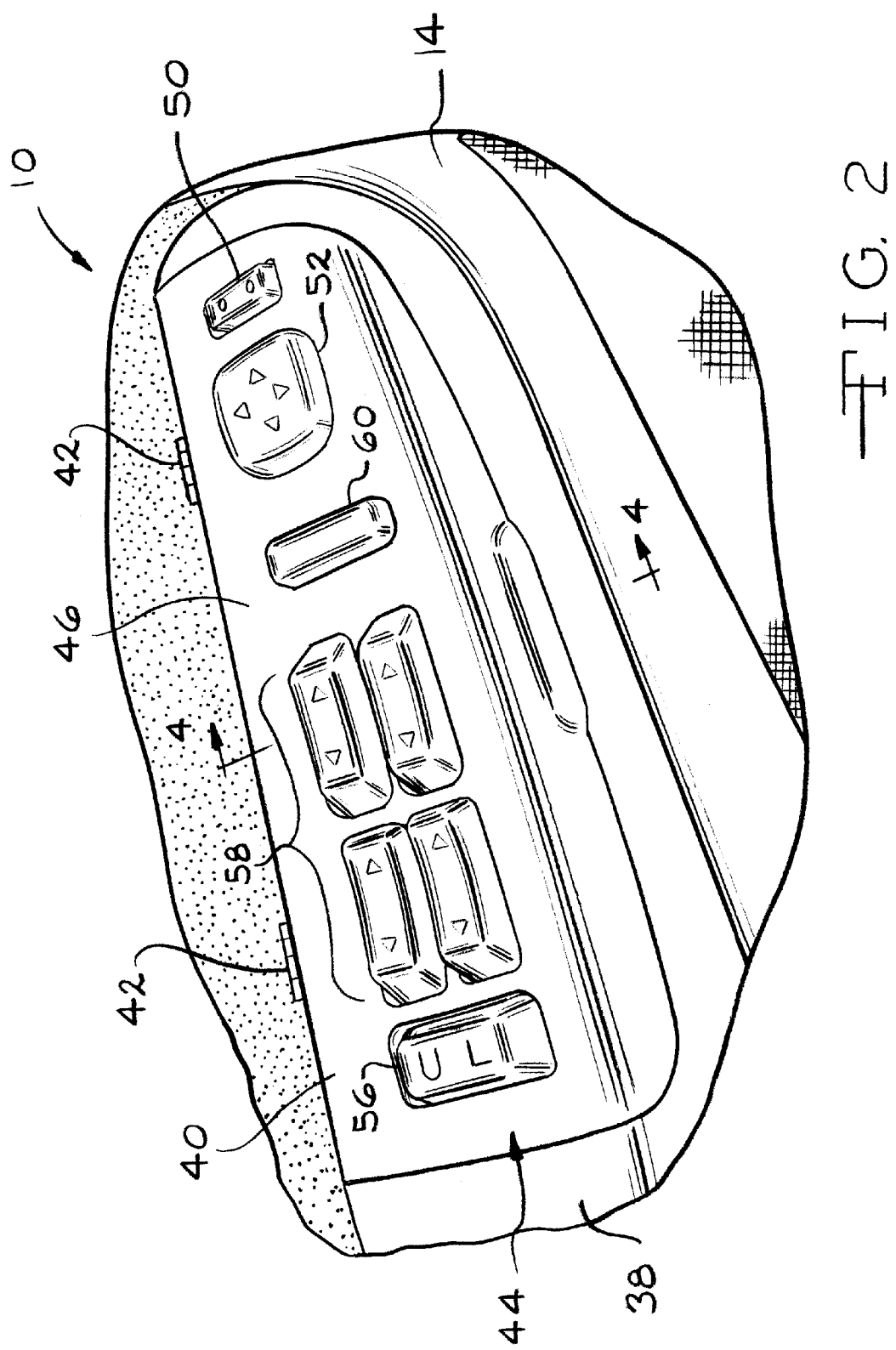
FIG. 2 is a perspective view of the control panel of FIG. 1, wherein the door panel is in its closed position.

Referring now to the drawings, there is illustrated in FIGS. 1 and 2 a control panel, indicated generally at 10, in accordance with the present invention. As will be described below, the control panel 10 and the other embodiment of control panels disclosed herein include a plurality of controls for controlling various electrical components or accessories of the vehicle, such as seats, mirrors, windows, door locks, pedal adjustment mechanisms, and steering column adjustment mechanisms.

Figure 3:
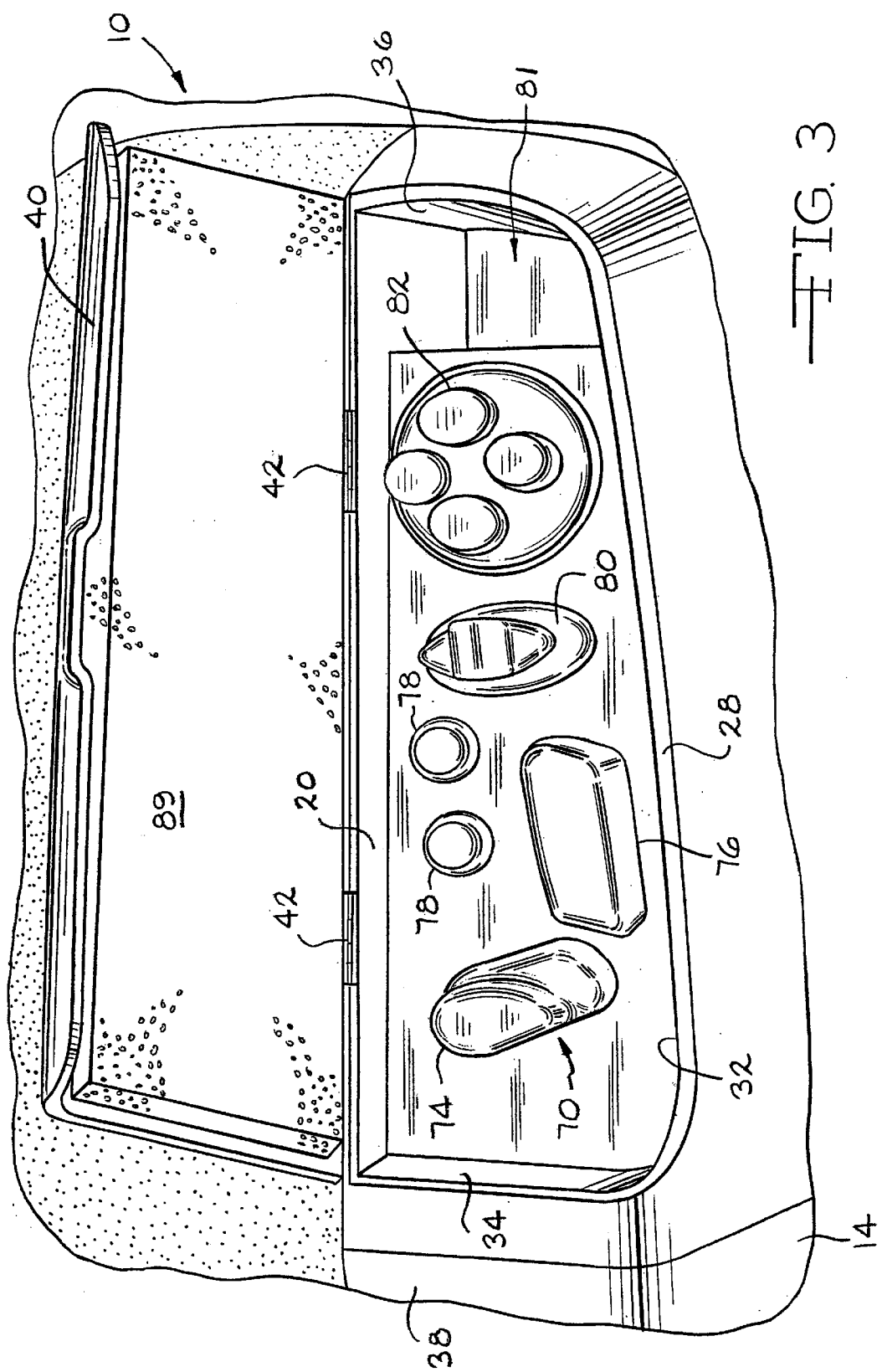
FIG. 3 is a perspective view of the control panel of FIG. 1, wherein the door panel is in its open position.

The control panel 10 is preferably located at a location which is convenient for the user or occupant of the vehicle. For example, the control panel 10 is preferably located and incorporated into an armrest 14 of a vehicle door trim panel 16, as best shown in FIGS. 1 through 3. Of course, the control panel 10 can be located anywhere within the interior, such as an instrument panel, center console, or overhead console.

Figure 4:
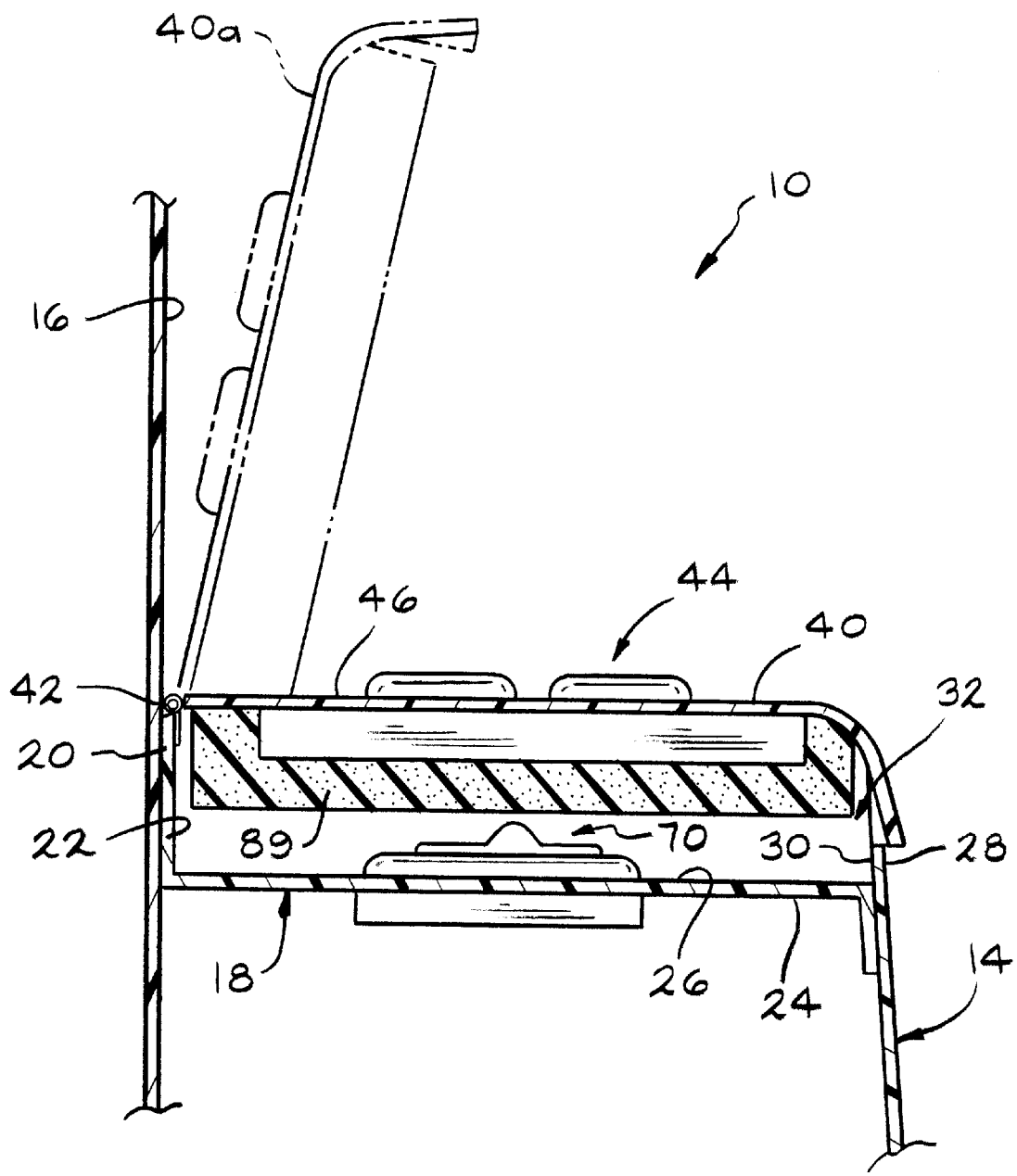
FIG. 4 is cross-sectional view of the control panel taken along Line 4—4 in FIG. 2.

The control panel generally includes a housing 18, as best shown in FIG. 4. The housing 18 can be any suitable structure for containing and mounting the components of the control panel 10. For example, the housing 18 can be integrally formed in the armrest 14 of the door trim panel 16. The housing 18 can be a separate module or can be integrally formed in an interior trim panel. As shown in FIG. 4, the housing 18 includes a generally vertical outboard panel 20 having an inner surface 22. The panel 20 can be separate or formed from part of the door trim panel 16. The housing 18 also includes a bottom panel 24 having a surface 26, and a generally vertical inboard panel 28 having an inner surface 30. The surfaces 22, 26, and 30 define a recess 32. The recess 32 is also defined by end walls 34 and 36, as shown in FIG. 3. The recess 32 can have any suitable shape, but preferably conforms to the shape of the armrest 14. The recess 32 is located underneath a top surface 38 of the armrest 14.

The control panel 10 further includes an access or door panel 40 which is movably mounted on the housing 18. Preferably, the door panel 40 is pivotally mounted on the housing 18 by one or more hinges 42. As best shown in FIG. 4, the hinges are mounted adjacent the outboard panel 20. Of course, the panel 40 can be pivotally mounted on the housing 18 by any suitable manner. The panel 40 is movable between a normally closed position, as shown in FIGS. 1 and 2, and an open position, as shown in FIGS. 3 and 4, as indicated by phantom lines 40a in FIG. 4. In the closed position, the panel 40 is positioned generally above and substantially closes off the open upper portion of the recess 32. Of course, the control panel 10 may be configured such that the panel 40 only partially covers the recess 32, for example, if the opening of the recess 32 is larger than the panel 40. In the open position, the panel 40 generally exposes the opening of the recess 32 to permit easy access to control mechanisms mounted therein which are normally hidden from view when the panel 40 is in its closed position, as will be explained below. Although the panel 40 is shown and described in FIGS. 1–4 as being pivotally mounted on the housing 18, the panel 40 can be movably mounted by any suitable structure, such as by a sliding, rotating, or a rolling apparatus. Also, the panel 40 could be pivotally mounted at any suitable location, such as by hinges (not shown) mounted on the end wall 36 such that the panel flips forward instead of from the side, as shown in FIGS. 3 and 4.

The control panel 10 includes a first bank of control mechanisms or controls, indicated generally at 44, which are mounted on and extend upwardly from a top surface 46 of the panel 40. Preferably, the top surface 46 of the panel 40 is flush and generally co-planar with the surface 38 of the armrest 14. The controls mechanisms of the control panels as described and shown herein can be any suitable control mechanism, such as an electrical switch, button, slide, toggle, or rotary knob which controls a corresponding electrical components of the vehicle. The control mechanisms can also be mechanically actuated mechanisms such as cable connected knobs for controlling side view mirror assemblies (not shown).

Preferably, the first bank of controls 44 includes control mechanisms which are frequently used by the driver or passenger of the vehicle since the panel 40 is normally in its closed position. For example, the bank of controls 44 can include a side view mirror selection switch 50 (left and right) and a four way position control knob 52 for controlling the position of a side view mirror (not shown). The bank of controls 44 can also include a power door lock/unlock switch 56, power window switches 58, and a push button switch 60 for locking control of auxiliary power window switches.

As shown in FIGS. 3 and 4, the control panel 10 includes a second bank of controls, indicated generally at 70, which are mounted on the bottom panel 24 of the housing 18. If desired, the second bank of controls can be mounted on a separate module (not shown) which is installed in the recess 32. Similar to the first bank of controls 44, the second bank of controls 70 can include any suitable control mechanisms. Preferably, the second bank of controls 70 includes controls which are infrequently used by the driver or passenger of the vehicle since the panel 40 is normally in its closed position, thereby covering or hiding the second bank of controls 70. For example, the bank of controls 70 can include a seat recliner switch 74 and a six-way control switch 76 for controlling the fore, aft, and height adjustments of a powered seat. The second bank of controls 70 can also include a pair of switches 78 for controlling heated and/or cooled seats. Also, a selector switch 80 may be provided for selectively controlling a four-way switch 82, for controlling either the up/down/in/out motion of a seat lumbar support or the first/second/exit/set controls of a memory circuit for automatically actuating seats, mirrors, radio to preset positions, pedal adjustment mechanisms, and/or steering column adjustment mechanisms. Of course, the first and second banks of controls can have any other desirable controls.

The bank of controls 44 and 70 can be mounted on the panel 40 and bottom panel 24, respectively, by any suitable manner. Preferably, the controls 44 are wired by a flat flexible cable (not shown) which travels through or about the hinge point of the panel 40 with respect to the housing 18. Of course, the wiring can be routed by any suitable manner, such as through a hollow hinge member (not shown). The controls 44 and 70 can be connected with a multiplex bus wiring scheme or using a direct connection, but can be wired by any suitable manner.

The controls 44 and 70 can also be connected using radio frequency (RF) transmitters. The receiver can be a separate dedicated receiver for the controls 44 and 70 or an existing receiver for a remote keyless entry system (not shown) could be utilized. For example, due to possible wear problems with using wires for the controls 44 in the hinged door panel 40, it may be desirable to use RF transmitters.

One of the advantages of the control panel 10 is that all of the controls of the control panel 10 can be mounted at an ergonomically and convenient location at the forward portion of the armrest 14. By using the movable panel 40 to stack two layers of controls, a relatively large number of controls can be mounted in a relatively small and convenient area. Conventionally, the controls in the second bank of controls 70 are mounted at less desirable areas such as the lower portions of the seat or on the instrument panel. By providing more frequently used controls on the exposed surface 46 of the panel 40 when in its closed position, the user only has to open the panel 40 a generally infrequent number of times when the second bank of controls 40 are used.

The control panel 10 can also be configured so that a portion of the control mechanisms 44 are not independent switches but are movable knobs which when depressed or otherwise controlled, physically engage one of the controls 70 directly underneath. A separate indicator switch (not shown) can be installed between the panel 40 and the housing 18 to indicate whether the panel 40 is in its open or closed position.

The control panel 10 may also include a foam pad 89 mounted on the underside of panel 40 to protect the second bank of controls 70 if, for example, the panel 40 is depressed downward too far and hits the upper portions of the second bank of controls 70.

Although the control panel is shown and described as being horizontally mounted on the armrest 14, the control panel 10 could be mounted vertically, for example, on the door trim panel 16, with the panel 40 being movable to a position to provide access to the second bank of control 70.

The present invention also includes a method of installing the control panel 10 in a vehicle. The first step of installing the control panel 10 is to select a location in the vehicle interior which provides a convenient location for a user, such as the driver, to access a plurality of control mechanisms which operate various vehicle components. An example of a convenient location is on the armrest 14 of the door trim panel 12, as shown in FIG. 1. This location is generally convenient because of being in short reach and high visibility to the user. A primary set of control mechanisms and a secondary set of control mechanisms are then identified from the plurality of control mechanisms. For example, the primary set of control mechanisms can include one of more of the controls of the first bank of controls 44. The secondary set of control mechanisms can include one or more of the controls of the second bank of controls 70. Preferably, the primary set is identified by the relative frequent use of the control mechanisms. Generally, the controls 70 are used less frequently than the controls 44. The primary and secondary set of control mechanisms are then located and installed at the convenient location, such as mounting them in the armrest 14. The panel 40 is provided to cover the secondary set of control mechanisms. This covering provides an advantage of not cluttering up the location of the controls with many controls. When access is needed to the less frequently used secondary controls, the panel 40 can be moved to expose the secondary controls.

The recess 32 of the control panel 10 may also define a storage compartment 81 or coin/ashtray bin. The control panel 10 could also be configured without the second bank of control 70 for vehicles which do not include the accessories associated with the second bank of control 72 to provide a larger storage compartment. For example, a vehicle manufacture may assemble a vehicle having two or more option packages, wherein a first option package includes the first bank of controls 44 and the second bank of controls 70. The second option package may only include the first bank of controls 44 because the electrical components of all or some which are associated with the second bank of controls is not installed in the vehicle. It would be desirable to use at least a portion of the space within the recess 32 as a storage compartment if the second option package was installed in the vehicle. The storage compartment can be simply an open compartment or house another storage module, such as for example, a coin dispenser. For installation, the second bank of controls 70 can be housed in a single module (not shown) which is installed within the recess 32.

Figure 5:
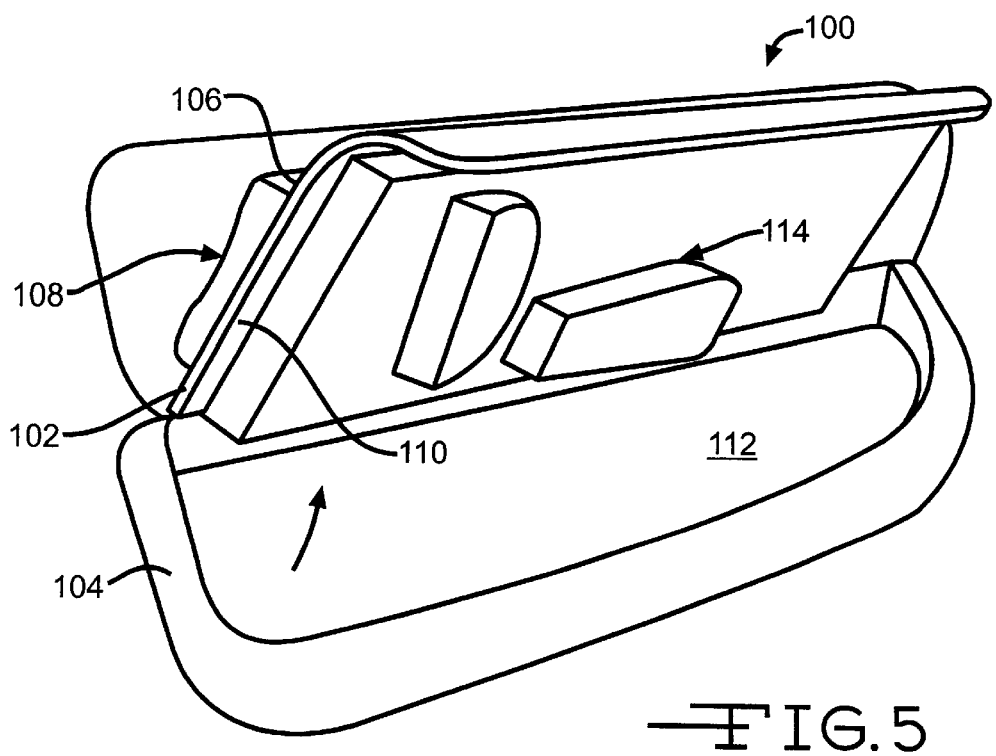
FIG. 5 is a perspective view of an alternate embodiment of a control panel.

There is illustrated in FIG. 5 an alternate embodiment of a control panel, indicated generally at 100. The control panel 100 can include any of the features of the various control panels described herein, and preferably includes a plurality of controls for controlling various electrical components or accessories of the vehicle, such as seats, mirrors, windows, door locks, pedal adjustment mechanisms, and steering column adjustment mechanisms. The control panel 100 includes a door panel 102 pivotally mounted on a trim housing 104, such as an armrest. The panel 102 is shown in its substantially open position in FIG. 5. The door panels 102 can have any suitable shape or thickness and preferably corresponds to the contour and shape of the trim housing 104 such that the door panel 102 is generally flush with the trim housing when in its closed position. The door panel 102 includes a first or upper side 106 facing upwardly into the interior of the vehicle.

A first bank of controls, indicated generally at 108, are mounted on and extend upwardly from the upper side 106 of the panel. The panel 102 also includes a second or lower side 110 which faces and selectively covers a recess 112 formed in the trim housing 104. A second bank of controls 114, preferably less frequently used than the first bank of controls 108, are mounted on the door panel 102. For example, the second bank of controls 114 of the illustrated embodiment of the control panel 100 shown in FIG. 5 is a seat controller. The door panel 102 is pivotally mounted on the trim housing such that the panel is movable between an open and a closed position approximately 90 degrees apart from one another. The panel 102 is movable in a similar manner as the control panel 40, between a normally closed position, such that the door panel 102 conceals the recess 112 and the second bank of controls 108, and an open position, as shown in FIG. 5, to expose the recess 112 and the second bank of controls 114. The recess 112 can be used as a storage compartment to store items such as coins, mobile phones, or additional controls.

Alternatively, the recess 112 may house a third bank of controls (not shown). Preferably, the panel 102 includes a detent lock mechanism (not shown) for maintaining the panel 102 in its open position for ease in manipulation of the bank of controls 114.

Figures 6, 7:
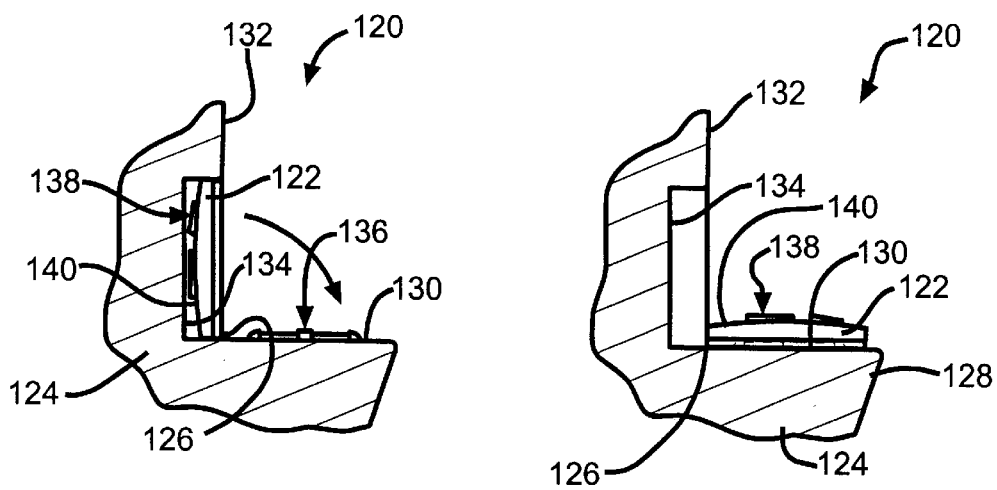
FIG. 6 is an end cross sectional view of an alternate embodiment of a control panel, wherein a door panel is shown in a first position.
FIG. 7 is an end cross sectional view of the control panel of FIG. 6, wherein the door panel is shown in a second position.

There is illustrated in FIGS. 6 and 7 another alternate embodiment of a control panel, indicated generally at 120. The control panel 120 can include any of the features of the various control panels described herein, and preferably includes a plurality of controls for controlling various electrical components or accessories of the vehicle, such as seats, mirrors, windows, door locks, pedal adjustment mechanisms, and steering column adjustment mechanisms. The control panel 120 includes a door panel 122 pivotally mounted on a trim housing 124 about a pivot 126. The trim housing 124 preferably is a door trim panel of a vehicle. The trim housing includes an armrest portion 128 having a generally horizontal surface 130. The trim housing 124 also includes a generally vertical wall portion 132 having a recess 134 formed therein.

A first bank of controls, indicated generally at 136, are mounted on the armrest portion 128 and extend upwardly from the surface 130. A second bank of controls, indicated generally at 138, are mounted on a first surface 140 of the panel 122. Preferably, the first bank of controls 136 are the more frequently used controls compared to the second bank of controls 138. The door panel 122 is normally in a vertical position, as shown in FIG. 6, and preferably is disposed in the recess 134 formed in the vertical wall portion 132. The second bank of controls 138 face the interior of the recess 134 when the panel 122 is in its vertical position, thereby concealing the bank of controls 138. Preferably, the panel 122 is relatively thin and includes a second surface opposite the first surface 140 which is substantially flush with the exterior surface of the wall portion 132. The door panel 122 is movable to a generally horizontal position, as shown in FIG. 7 to expose the second bank of controls 138. When the panel 122 is in its horizontal position, the first bank of controls 136 are concealed. Of course, the door panel 122 does not have to cover or conceal all of the second bank of controls 130, but may only cover a portion of them.

Figure 8:
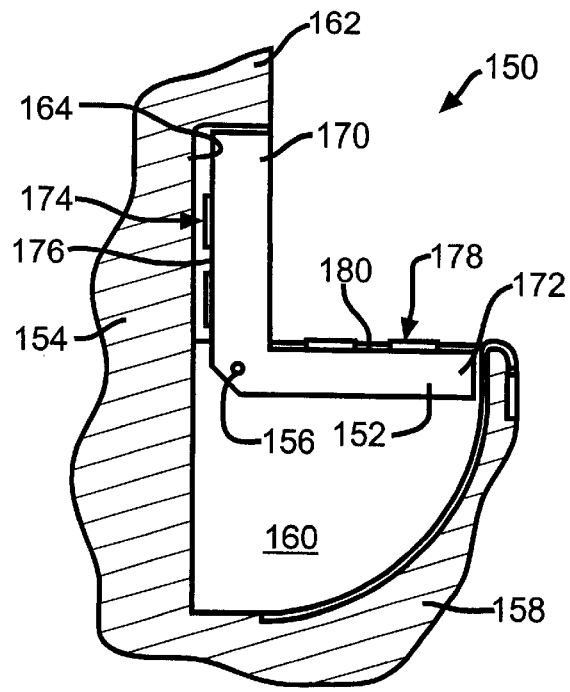
FIG. 8 is an end cross sectional view of an alternate embodiment of a control pane, wherein a door panel is shown in a first position.
Figure 9:
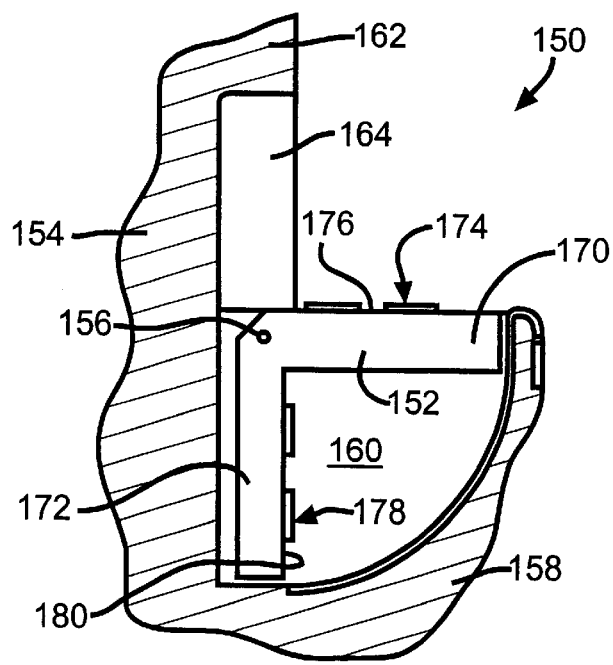
FIG. 9 is an end cross sectional view of the control panel of FIG. 8, wherein the door panel is shown in a second position.

There is illustrated in FIGS. 8 and 9 another alternate embodiment of a control panel, indicated generally at 150. The control panel 150 can include any of the features of the various control panels described herein, and preferably includes a plurality of controls for controlling various electrical components or accessories of the vehicle, such as seats, mirrors, windows, door locks, pedal adjustment mechanisms, and steering column adjustment mechanisms. The control panel 150 includes a panel 152 pivotally mounted on a trim housing 154 about a pivot 156. The trim housing 154 preferably is a door trim panel of a vehicle. The trim housing 154 includes an armrest portion 158 having a recess 160 formed therein. The recess 160 has a generally quadrant cylindrical cross-sectional shape for receiving the pivoting panel 152 as described in more detail below. The trim housing 154 also includes a generally vertical wall portion 162 having a recess 164 formed therein for also receiving a portion of the panel 152. The recess 164 has a generally rectangular cross-sectional shape.

The door panel 152 has a generally L-shaped cross section defining a first portion 170 and a second portion 172 extending generally 90 degrees from the first portion 170. The first and second portions 170 and 172 are generally shaped as relatively thin rectangular blocks extending along the length of the armrest portion 158. A first bank of controls 174 are mounted on a surface 176 of the first portion 170. A second bank of controls 178 are mounted on a surface 180 of the second portion 172. The door panel 152 is rotatable about the pivot 156 between a first position, as shown in FIG. 8, in which the first portion 170 is generally vertical and the second portion 172 is generally horizontal, and a second position (90 degrees from the first position), as shown in FIG. 9, in which the first portion 170 is generally horizontal and the second portion 172 is generally vertical below the first portion. In the first position, the first bank of controls 174 are concealed within the recess 164, and the second bank of controls 178 are exposed to a generally horizontal position, and are preferably flush with the surface of the armrest portion. In the second position, the first bank of controls are exposed to a generally horizontal position (generally the same position as the first bank of control in the first position) and the second bank of the controls are concealed underneath the first bank of controls in the recess 160.

The door panel 152 can be operated by any suitable mechanism for moving the door panel 152 between one or both of its positions. Preferably, the control panel 150 includes a latching mechanism (not shown) for maintaining the door panel 152 in one or both of its first and second positions so that operation of the controls does not inadvertently move the door panel 152.

Figure 10:
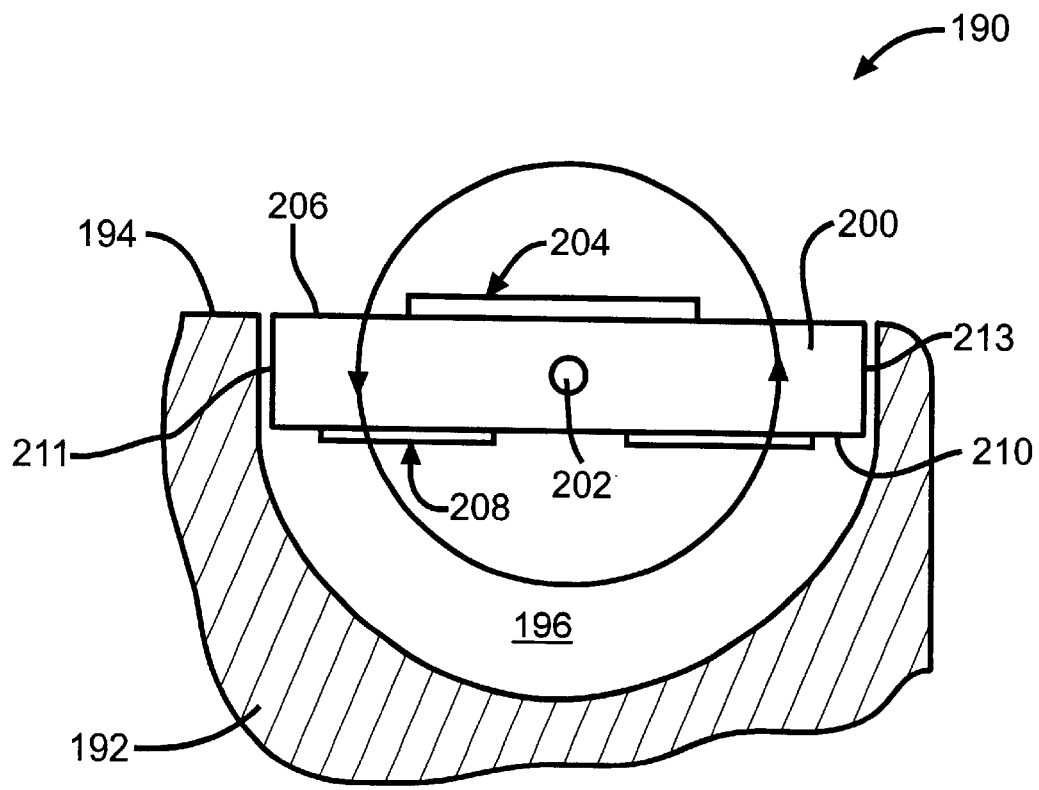
FIG. 10 is an end cross sectional view of an alternate embodiment of a control panel.

There is illustrated in FIG. 10 another alternate embodiment of a control panel, indicated generally at 190. The control panel 190 can include any of the features of the various control panels described herein, and preferably includes a plurality of controls for controlling various electrical components or accessories of the vehicle, such as seats, mirrors, windows, door locks, pedal adjustment mechanisms, and steering column adjustment mechanisms.

The control panel 190 includes a trim housing panel 192, such as an armrest panel, having a generally horizontal surface 194. The trim housing panel 192 includes a recess 196 formed in the horizontal surface 194. The recess 196 has an arcuate shape, and more preferably has a generally half cylindrical cross-sectional shape for accommodating the movement of a rotating door panel 200. The door panel 200 is pivotally mounted in the trim housing panel 192 about a pivot 202. The pivot 202 defines a pivot axis which is preferably symmetrically oriented between side edges 211 and 213 of the panel 200. Thus, the pivot axis extends through a central portion of the panel 200. The panel 200 is shaped as a relatively thin rectangular block extending along the length of the armrest. A first bank of controls 204 are mounted on a surface 206 of the panel 200. A second bank of controls 208 are mounted on a surface 210 of the panel 200. The panel 200 is rotatable about the pivot 202 between first and second positions. In the first position, as shown in FIG. 10, the first bank of controls 204 are facing upwardly, and the second bank of controls are concealed in the recess 196. In the second position, panel has rotated about 180 degrees about the pivot 202 such that the first bank of controls 204 are concealed in the recess 196, and the second bank of controls 208 are now facing upwardly.

The door panel 200 can be operated by any suitable mechanism for moving the door panel 200 between one or both of its positions. Preferably, the control panel 190 includes a latching mechanism (not shown) for maintaining the door panel 200 in one or both of its first and second positions so that operation of the controls does not inadvertently move the door panel 200.

Figure 11:
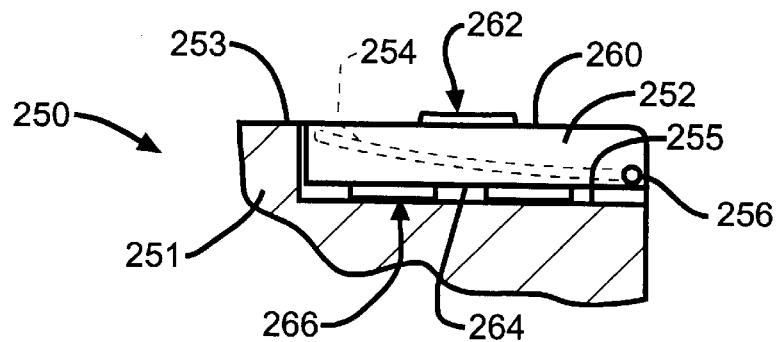
FIG. 11 is an end cross sectional view of an alternate embodiment of a control panel, wherein a door panel is shown in a first position.
Figure 12:
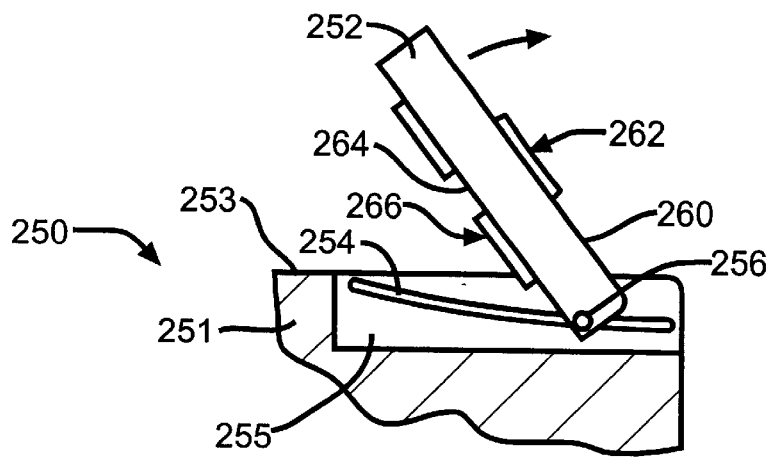
FIG. 12 is an end cross sectional view of the control panel of FIG. 11, wherein the door panel is in an intermediate position.
Figure 13:
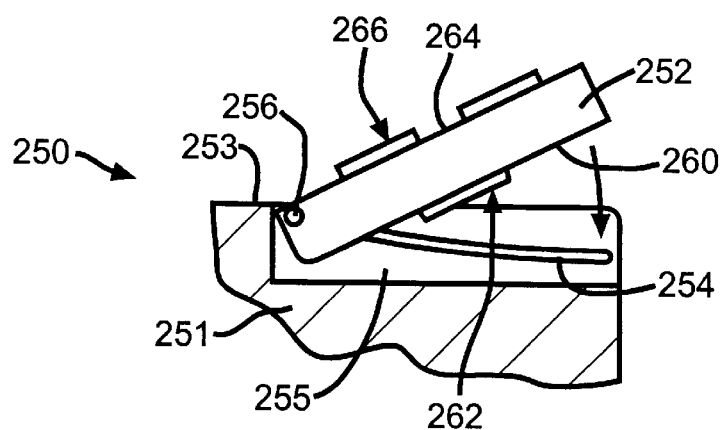
FIG. 13 is an end cross sectional view of the control panel of FIG. 11, wherein the door panel is almost in a second position.

There is illustrated in FIGS. 11 through 13 another alternate embodiment of a control panel, indicated generally at 250. The control panel 250 can include any of the features of the various control panels described herein, and preferably includes a plurality of controls for controlling various electrical components or accessories of the vehicle, such as seats, mirrors, windows, door locks, pedal adjustment mechanisms, and steering column adjustment mechanisms.

The control panel 250 includes a trim panel housing 251, such as an armrest, having a generally horizontal surface 253. A recess 255 is formed in the surface 253. The recess 255 has a generally rectangular cross-sectional shape. A generally flat rectangular block shaped panel 252 is movable within a track 254 about a pin 256 attached to the panel 252. The pin 256 both rotates and slides within the track 254, thereby permitting movement of the panel 252 relative to the trim panel housing 251. The track 254 can have any suitable profile to provide the flipping motion of the panel 252. The panel 252 is essentially movable between two positions similar to the panel 200 of FIG. 10, but instead of rotating 180 degrees about a stationary pivot, the panel 252 has a moving pivot point. This movement provides the same positions of the panel 200 but in a smaller package area, i.e., the depth of the arcuate or half cylindrical recess 196 is not required. The panel 252 is moveable between a first horizontal position, as shown in FIG. 11, and a second horizontal position, as shown almost completed in FIG. 13, which is approximately 180 degrees flipped from the first position. FIG. 12 illustrates an intermediate position between the first and second positions. The panel 252 includes a first surface 260 having a first bank of controls 262, and a second surface 264 having a second bank of controls 266. When the panel 252 is in its first position, the first bank of controls 262 is exposed to the user, and the second bank of controls 266 is concealed in a generally rectangular recess formed in a housing. When the panel 252 is in its second position the second bank of controls 266 is exposed, and the first bank of controls 262 is concealed in the recess.

The door panel 252 can be operated by any suitable mechanism for moving the door panel 252 between one or both of its positions. Preferably, the control panel 250 includes a latching mechanism (not shown) for maintaining the door panel 252 in one or both of its first and second positions so that operation of the controls does not inadvertently move the door panel 252.

Figure 14:
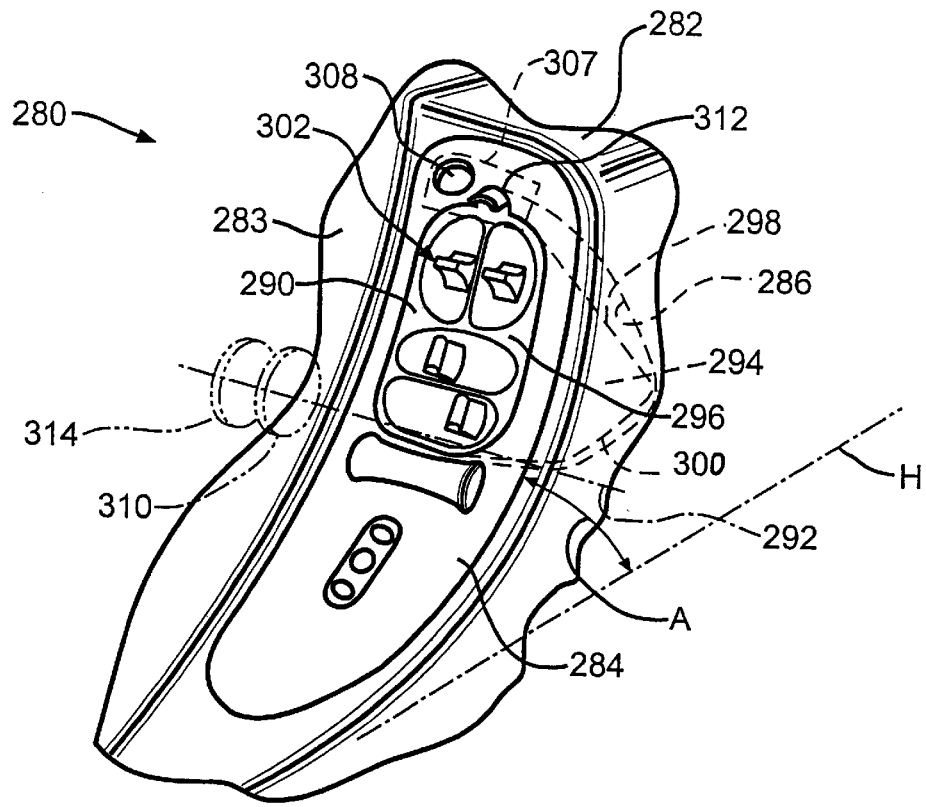
FIG. 14 is a perspective view of an alternate embodiment of a control panel, wherein a movable panel is shown in a first position.
Figure 15:
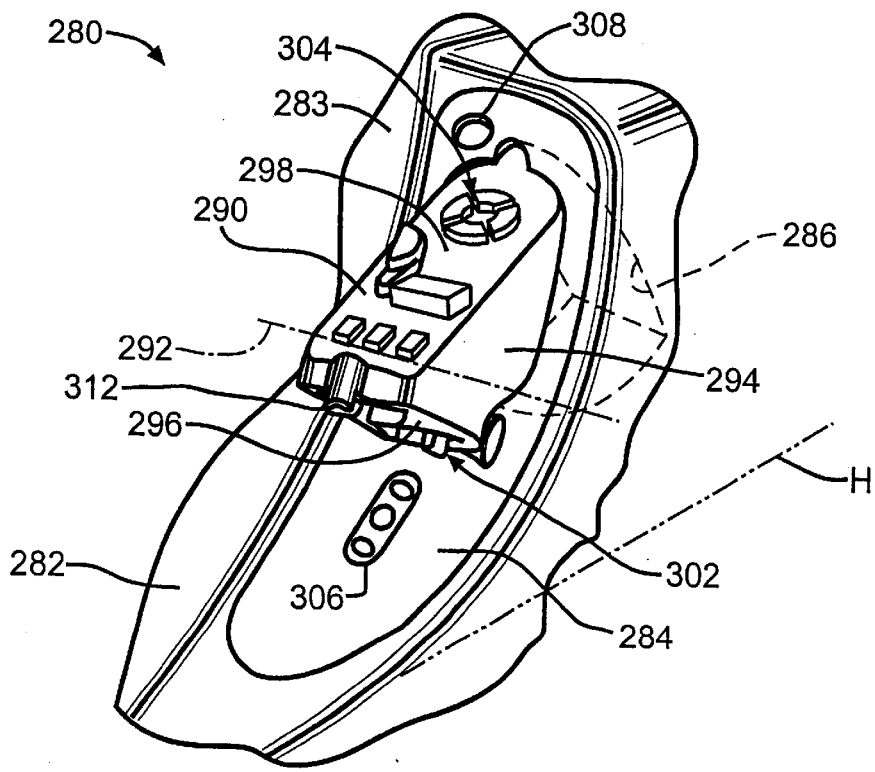
FIG. 15 is a perspective view of the control panel of FIG. 14, wherein the panel is in a second position.

There is illustrated in FIGS. 14 and 15 another alternate embodiment of a control panel, indicated generally at 280. The control panel 280 can include any of the features of the various control panels described herein, and preferably includes a plurality of controls for controlling various electrical components or accessories of the vehicle, such as seats, mirrors, windows, door locks, pedal adjustment mechanisms, and steering column adjustment mechanisms.

The control panel 280 includes a trim housing 282 which is preferably a portion of a door trim panel. The trim housing 282 includes a generally vertical surface 283 and another surface 284 which is generally angled forwardly and upwardly relative to a horizontal axis H by an angle A. The surface 284 is preferably a portion of an armrest. The surface 284 can be flat or can have a curved contour. For example, in the embodiment of the surface 284 illustrated in FIGS. 14 and 15, the surface 284 has a slight concave contour for aesthetic reasons. The surface 284 has a triangular block shaped recess 286 formed therein for receiving a pivotally mounted triangular shaped panel 290.

The panel 290 is pivotally mounted relative to the trim housing 282 at a pivot axis 292 by any suitable manner. As stated above, the panel 290 has a generally triangular block shape and includes a pair of side walls 294 (only one side wall viewable in FIGS. 14 and 15), a first side 296, a second side 298, and a third side. The first side 296 generally defines a surface or a plane which is at an acute angle with respect to a surface or plane defined by the second side 298. A first bank of controls 302 are mounted on the first side 296, and a second bank of controls 304 are mounted on the second side 298. In the embodiments shown, there are no controls mounted on the third side 300 which generally always remains hidden in the recess 286 during movement of the panel 290. Preferably, the first bank of controls 302 are used more frequently than the second bank of controls 304. Note that the control panel 280 may also include additional controls 306 mounted on the surface 284 and not on the panel 290.

The panel 290 is pivotably mounted about the pivot axis 292 and is movable between first and second positions. In the first position, as shown in FIG. 14, the first side 296 is generally flush with the surface 284 to reveal the first bank of controls 302, and conceal the second bank of controls 304. In the second position, the panel 290 is pivoted about the pivot axis 292 in a rearward manner to a position as shown in FIG. 15. In the second position, the second bank of controls 304 are in plain view and in an easily accessible area. Note that the first bank of controls 302 are not concealed in the recess 286 but are placed in a less accessible position in front of the panel 290.

The panel 290 can be operated by any suitable mechanism for moving the panel 290 between one or both of its positions. For example, the control panel 280 may include a latch mechanism, indicated schematically at 307, operated by a push button switch 308 which releases the panel 290 from its first position. The latch mechanism 307 can be manually operated or electrically operated. Preferably, the control panel 280 would further include a spring mechanism, indicated schematically at 310 for biasing the panel 290 to its second position upon actuation of the latch mechanism 307. To move the panel 290 to its first position, the panel 290 could simply be manually pushed back until the latch mechanism maintains the panel 290 in its first position.

Alternatively, the control panel 280 can include a manual pull tab 312 at the upper portion of the first side 296 to assist in manually pulling the panel 290 to its second position from its first position. The latch mechanism 307 could then maintain the panel 290 in its second position. To move the panel 290 back to its second position, the latch mechanism 307 could be operated by the push button switch 308. For this embodiment, the spring mechanism 310 would bias the panel 290 to its first position. A damper mechanism, indicated schematically at 314, would preferably be attached between the trim panel housing 282 and the panel 290 to dampen the motion of the panel when its returned to its second position.

Figure 17:
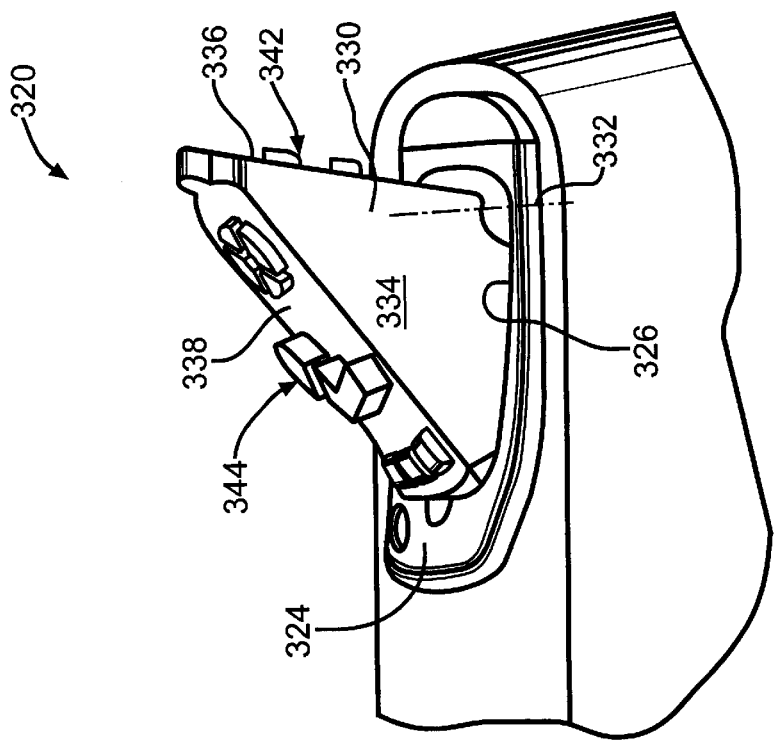
FIG. 17 is a perspective view of the control panel of FIG. 16, wherein the panel is in a second position.
Figure 16:
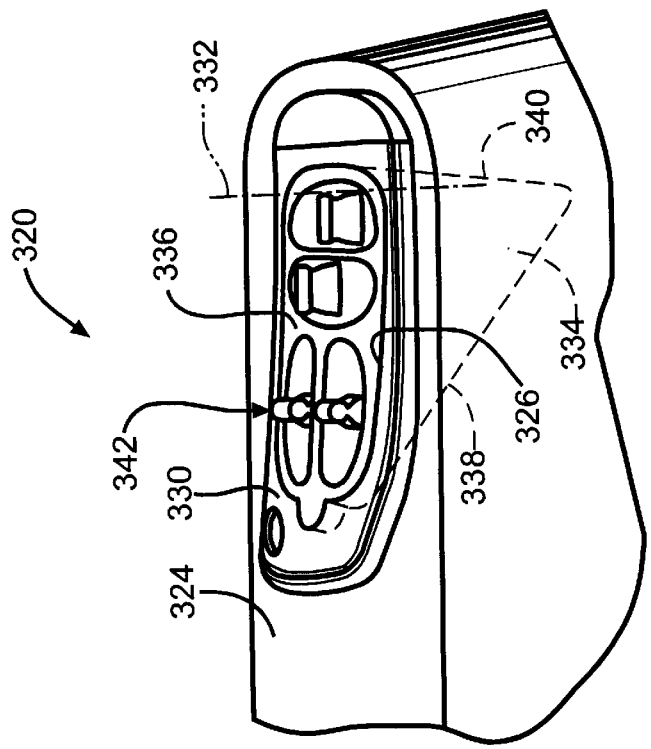
FIG. 16 is a perspective view of an alternate embodiment of a control panel, wherein a movable panel is shown in a first position.

The control panel 280 is ideally suited for placement in a vehicle in which the best placement for controls is in a forward portion of an armrest having an upwardly sloping angle, such as the surface 284 of the trim housing 282 shown in FIGS. 14 and 15. However, for vehicles having armrests only having a generally horizontal surface, an alternate embodiment of a control panel, indicated generally at 320 and illustrated in FIGS. 16 and 17 is preferred. The control panel 320 is similar to the control panel 280. The control panel 280 can include any of the features of the various control panels described herein, and preferably includes a plurality of controls for controlling various electrical components or accessories of the vehicle, such as seats, mirrors, windows, door locks, pedal adjustment mechanisms, and steering column adjustment mechanisms.

The control panel 320 includes a trim housing, such as an armrest, having a generally horizontal surface 324. A recess is 326 formed in the surface 324 for receiving a triangular block shaped panel 330. The panel 330 is pivotally mounted relative to the trim housing 322 about a pivot axis 332. The panel 330 includes a pair of side walls 334 (only one side wall viewable in FIGS. 16 and 17), a first side 336, a second side 338, and a third side 340. The first side 336 generally defines a surface or a plane which is at an acute angle with respect to a surface or plane defined by the second side 338. A first bank of controls 342 are mounted on the first side 336, and a second bank of controls 344 are mounted on the second side 338. Preferably, the first bank of controls 342 are used more frequently than the second bank of controls 344.

The panel 330 is pivotably mounted about the pivot axis 332 and is movable between first and second positions. In the first position, as shown in FIG. 16, the first side 336 is generally flush with the surface 324 to reveal the first bank of controls 342, and conceal the second bank of controls 344. In the second position, the panel 290 is pivoted about the pivot axis 332 in an upward and forward manner to a position as shown in FIG. 17. In the second position, the second bank of controls 344 are in an easily accessible area. Note that the first bank of controls 342 are not concealed in the recess 326 but are placed in a less accessible position in front of the panel 290. The panel 330 can be moved between and maintained in its first and second positions, by any suitable structures, such as by the latch mechanism 307, the push button switch 308, the spring mechanism 310, the pull tab 312, and the damper mechanism 314 described above with respect to the control panel 280.

There is illustrated in FIGS. 18 and 19 another alternate embodiment of a control panel, indicated generally at 350. The control panel 350 can include any of the features of the various control panels described herein, and preferably includes a plurality of controls for controlling various electrical components or accessories of the vehicle, such as seats, mirrors, windows, door locks, pedal adjustment mechanisms, and steering column adjustment mechanisms. As will be described in detail below, the control panel 350 is similar to the control panel 10 illustrated in FIGS. 1–4 with one of differences being that the lower bank of controls are moved upward when the panel is opened to provide easy access to the controls so that the user does not have to reach down into the recess.

The control panel 350 includes a trim housing 352, such as an armrest panel, having an upper generally horizontal surface 354 and a recess 356 formed therein extending downward from the surface 354. A first panel 358 is pivotally mounted relative to the trim housing 352 at a pivot 360. The first panel 358 includes an upper surface 362 having a first bank of controls 364 mounted thereon. A second panel 366 is disposed in the recess 356 and is movably mounted relative to the housing 352 such that the second panel 366 moves in a generally vertical direction within the recess 356. The second panel 366 includes an upper surface 368 upon which a second bank of controls 370 are mounted thereon. Preferably, the first back of controls 364 are used more often that the second bank of controls 370.

The first panel 358 is pivotally movable between first and second positions. In the first position, as shown in FIG. 18, the upper surface 354 of first panel 358 is in a generally horizontal position and the first panel 358 is covering the recess 356. Preferably, the first panel 358 is disposed in the recess 356 when in its first position such that the upper surface 354 of the first panel 358 is flush with the horizontal surface 354 of the trim housing 352. In the second position, as shown in FIG. 19, the first panel 358 is oriented in a generally vertical position to expose the recess 356 and the second bank of controls 370.

The second panel 366 is movable between a first lowered position within the recess 356, as shown in FIG. 18, and a second raised position within the recess 356, as shown in FIG. 19. Preferably, when the first panel 358 moves into its second position, the second panel 366 is automatically moved to its second position.

Any suitable mechanism can be used to raise and lower the second panel 366. For example, as best shown in FIG. 19, the first panel 358 can include an arm 372 extending from a lower surface 374 thereof which is disposed in a slot 376 formed in the second panel 366. Upon movement of the first and second panels 358 and 366 from their second positions to their first positions, pivotal movement of the first panel 358 will cause the arm 372 to abut against a surface of the second panel 366 within the slot 376, thereby pushing the second panel 366 downward. Preferably, a spring, schematically illustrated at 378, will bias the second panel 366 to its second position. The arm 372 will also function as a stop to prevent further upward movement of the second panel 366. Preferably, the upper surface 368 of the second panel 366 is flush with the surface 354 of the trim housing 352 when in its second position for aesthetic purposes.

Figure 20:
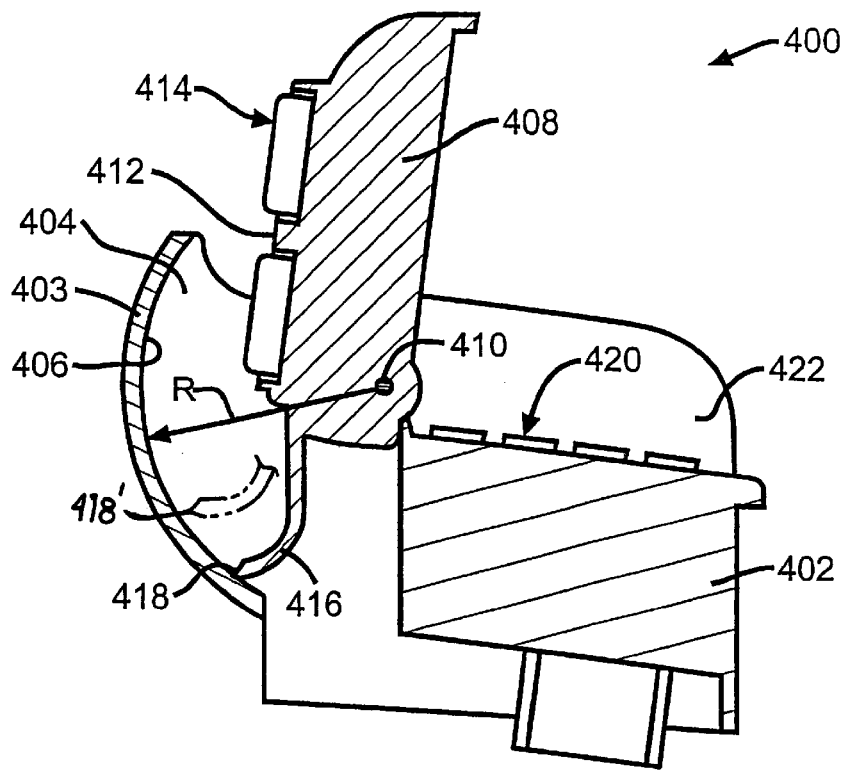
FIG. 20 is an end cross sectional view of an alternate embodiment of a control panel, wherein a scoop portion is shown in a first position.
Figure 21:
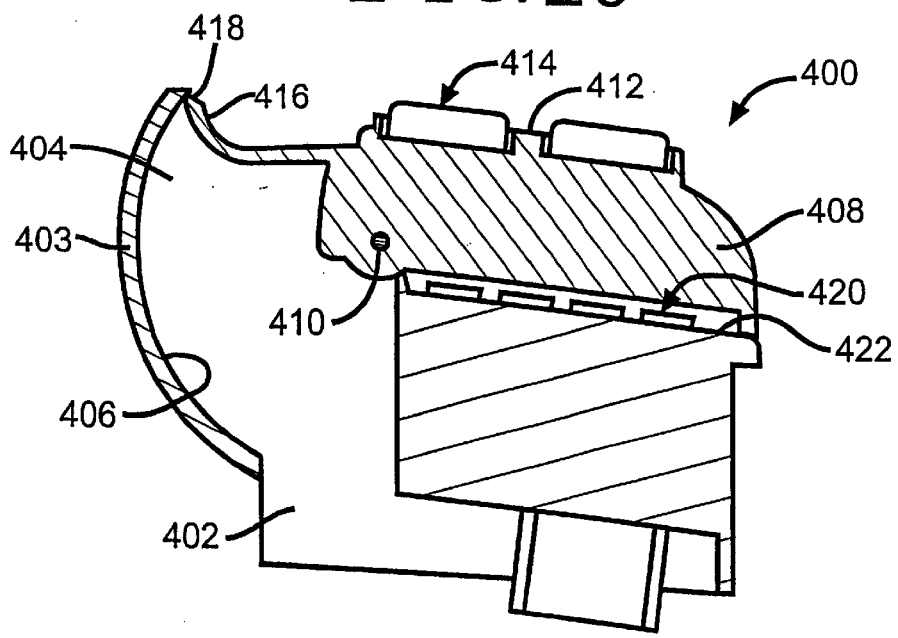
FIG. 21 is an end cross sectional view of the control panel of FIG. 20, wherein the scoop portion is in a second position.

There is illustrated in FIGS. 20 and 21 another alternate embodiment of a control panel, indicated generally at 400. The control panel 400 can include any of the features of the various control panels described herein, and preferably includes a plurality of controls for controlling various electrical components or accessories of the vehicle, such as seats, mirrors, windows, door locks, pedal adjustment mechanisms, and steering column adjustment mechanisms. The features of the control panel 400 can also used with any of the control panels described and shown herein. The control panel 400 is similar to the control panel 10 illustrated in FIGS. 1–4 with one of differences being that the control panel 400 includes a scoop portion to help prevent debris from interfering with the movement of the control panel.

The control panel 400 includes a bezel housing 402 for insertion into a recess of a trim housing, such as an armrest of a door trim panel. The bezel housing 402 has an edge 403 including an arcuate recess or trough 404 formed therein and defining a curved surface 406. The control panel 400 further includes a panel 408 pivotally mounted to the bezel housing 402 at a pivot 410. The panel 408 includes an upper surface 412 having a first bank of controls 414 mounted thereon. A second bank of controls 420 are mounted on the bezel housing 402 and preferably located within a recess 422 formed in the bezel housing 402. The panel 408 is movable between a first position, as shown in FIG. 21, and a second position, as shown in FIG. 20. In the first position, the panel 408 is in a generally horizontal position and is positioned over the second bank of controls 420 and preferably disposed in the recess 422. In the second position, the panel 408 is oriented in a generally vertical position to expose the recess 422 and the second bank of controls 420.

The panel 408 includes an arm or a scoop 416 which extends into the trough 404. The b scoop 416 has an end 418 which is preferably located adjacent the curved surface 406 of the bezel housing 402. The end 418 of the scoop 416 may be in contact with the curved surface 406, as shown in FIGS.

20 and 21, or may be spaced apart from the curved surface 406 as shown in phantom lines 418' illustrated in FIG. 20 in a moved intermediate position between the first and second positions. It is preferred that the end 418 of the scoop 416 be spaced less than 3 mm from the curved surface 406, and more preferably less than 1 mm.

A major portion of the curved surface 406 is preferably cylindrical shaped defined by a radius R preferably originating from the pivot 410. The length of the major portion of the curved surface 406 corresponds to the circular path of the end 418 of the scoop 416 as the panel 408 is moved between its first and second positions. The scoop 416 and curved surface 406 helps prevents debris, such as liquids, coins, candy, etc., from falling into the exposed portion of the trough 404 adjacent the pivot area of the panel 408 when the panel 408 is in its second position, and thereby jamming the pivoting connection of the panel 408. The end 418 scoops objects which have fallen into the trough 154. Although the scoop 416 can be any length, preferably the trough 404 extends along the entire length of the edge 403 of the bezel housing.

Figure 22:
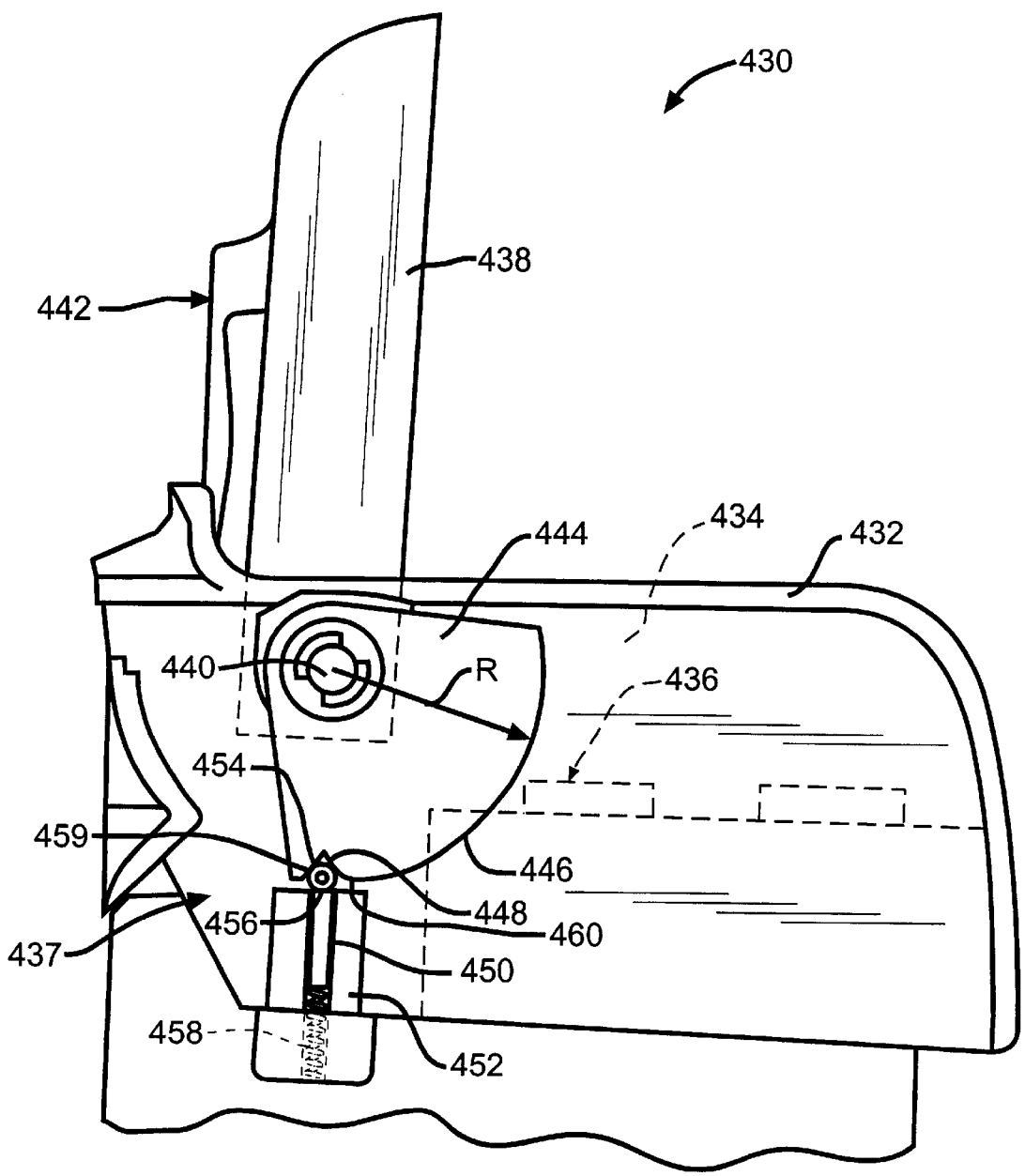
FIG. 22 is an end view of an alternate embodiment of a control panel having a detent mechanism.

There is illustrated in FIG. 22 another alternate embodiment of a control panel indicated generally at 430. The features of the control panel 430 can be used with any of the control panels described and shown herein. The control panel 430 is similar to the control panel 10 illustrated in FIGS. 1–4 and includes a bezel housing 432 for insertion into a recess of a trim housing, such as an armrest of a door trim panel. The bezel housing 432 includes a recess 434 having a second bank of controls 436 mounted therein. The control panel 430 further includes a panel 438 pivotally mounted to the bezel housing about a cylindrical pin 440 extending from the panel 438. The panel 438 includes a first bank of controls 442 mounted thereon.

The panel 438 is movable between a first position and a second position, as shown in FIG. 22. In the first position, the panel 438 is in a generally horizontal position and is positioned over the second bank of controls 436 and preferably disposed in the recess 434. In the second position, the panel 438 is oriented in a generally vertical position to expose the recess 434 and the second bank of controls 436.

The control panel 430 includes a detent mechanism, indicated generally at 437. Generally, the detent mechanism 437 biases the panel 438 in its open position, as shown in FIG. 22. The detent mechanism 437 includes a cam 444 which is rotationally fixed relative to the panel 438. Preferably, the cam 444 is mounted on the pin 440. The cam 444 includes a profile or curved cam surface 446 having an arcuate semi-circular shape defined by a radius R originating from the pivot axis defined by the pin 440. The cam surface 446 include an indentation or detent 448 formed therein extending inwardly towards the pivot axis. The detent mechanism 437 further includes a member or cam follower 450 slidably mounted relative to the bezel housing 432. Preferably, the cam follower 450 is slidably disposed in a track 452 formed in the bezel housing 432. The cam follower 450 includes an end 454 engaged with the cam surface 446. Preferably, the end 454 of the cam follower 450 includes a roller 456 rotatably mounted on the end 454 for rollingly engaging the cam surface 446 to reduce frictional contact therebetween. Of course, the end 454 of the cam follower 450 can simply be a rounded edge in sliding contact with the cam surface 446. A spring 458 disposed in the track 452 biases the end 454 of the cam follower 450 against the cam surface 446.

When the panel 438 is positioned as shown in FIG. 22, the end 454 of the cam follower 450 is disposed in the detent 448 of the cam surface 446, thereby temporarily locking the panel 438 into its open or second position to help prevent vibration rattle. To move the panel 438 out of this position, the panel 438 is rotated to push the end 454 of the cam follower 450 out of the detent 448. The force of the spring 458 acting on the cam follower 450 must be overcome to move the panel.

Preferably, the detent 448 is shaped such that a sudden relatively high sloped surface 459 engages the left-hand end of the roller 456 to help prevent further movement of the panel 438. Contrary, the detent 448 preferably includes a gradual curved surface portion 460 engaging the right-hand end of the roller 456 to provide a relatively smooth transition to and from the panel's locked position.

Although the detent mechanism 437 was described above as temporarily holding or locking the panel 438 in its open or second position, as shown in FIG. 22, a similar detent mechanism could also be included in the control panel 430 for temporarily holding or locking the panel 438 in its closed or first position. The control panel 430 could also include a pair of detent mechanisms for holding the panel 438 in both its first/closed and second/open positions.

Figure 23:
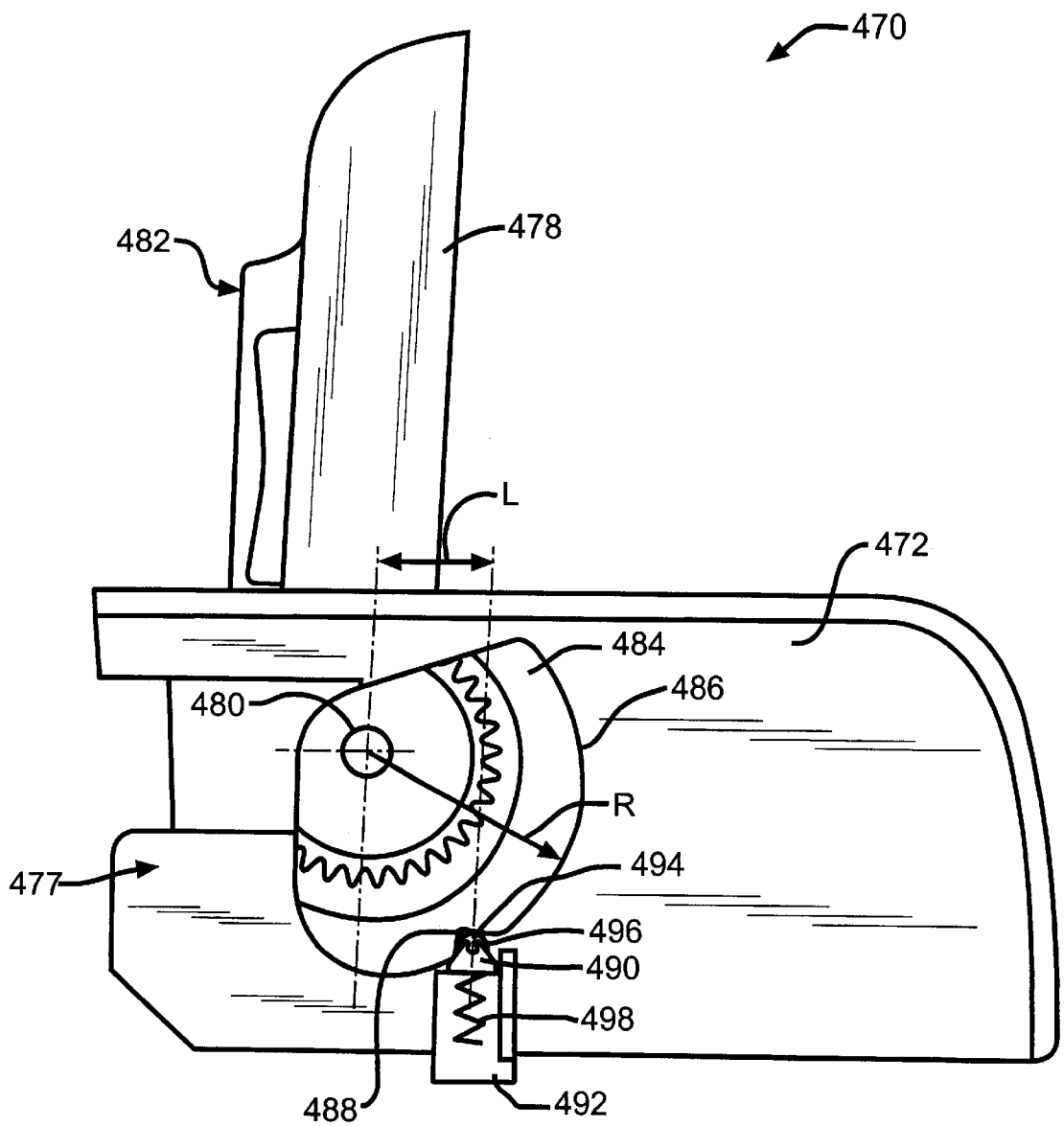
FIG. 23 is an end view of an alternate embodiment of a control panel having an alternate embodiment of a detent mechanism.

There is illustrated in FIG. 23 another alternate embodiment of a control panel indicated generally at 470. The features of the control panel 470 can be used with any of the control panels described and shown herein. The control panel 470 is similar to the control panel 430 illustrated in FIG. 22 and includes a bezel housing 472 for insertion into a recess of a trim housing, such as an armrest of a door trim panel. The bezel housing 472 includes a recess having a second bank of controls (not shown) mounted therein. The control panel 470 further includes a panel 478 pivotally mounted to the bezel housing about a cylindrical pin 480 extending from the panel 478. The panel 478 includes a first bank of controls 482 mounted thereon.

The panel 478 is movable between a first position and a second position, as shown in FIG. 23. In the first position, the panel 478 is in a generally horizontal position and is positioned over the second bank of controls. In the second position, as shown in FIG. 23, the panel 478 is oriented in a generally vertical position to expose the second bank of controls.

The panel includes a detent mechanism, indicated generally at 477. The detent mechanism 477 includes a cam 484 which is rotationally fixed relative to the panel 478. Preferably, the cam 484 is mounted on the pin 480. The cam 484 includes a profile or curved cam surface 486 having an arcuate semi-circular shape defined by a radius R originating from the pivot axis defined by the pin 480. The cam surface 486 include an indentation or detent 488 formed therein extending inwardly. The detent mechanism 477 further includes a member or cam follower 490 slidably mounted relative to the bezel housing 472. Preferably, the cam follower 490 is slidably disposed in a track 492 formed in the bezel housing 473 for general vertical movement therein, as viewing FIG. 23. The cam follower 490 includes an end 494 engaged with the cam surface 486. Preferably, the end 494 of the cam follower 490 includes a roller 496 rotatably mounted on the end 494 for rollingly engaging the cam surface 486 to reduce frictional contact therebetween. Of course, the end 494 of the cam follower 490 can simply be a rounded edge in sliding contact with the cam surface 486. A spring 498 disposed in the track 492 biases the end 494 of the cam follower 490 against the cam surface 486.

Note that the spring 458 of the detent mechanism 437 illustrated in FIG. 22 exerts a force in a generally vertical direction through the pivot axis. Contrary, the spring 498 of the detent mechanism 477 illustrated in FIG. 23 exerts a force in a generally vertical direction but is offset to the pivot axis by a length L. This offset provides an assisting force from the spring 498 acting on a detent surface to rotate the cam 484 in a counter-clockwise direction, as viewing FIG. 23. Preferably, the location of the detent 488 provides an assisting force in the last 5 to 20 degrees of rotation of the panel 478 from its first position to its second position.

Figure 25:
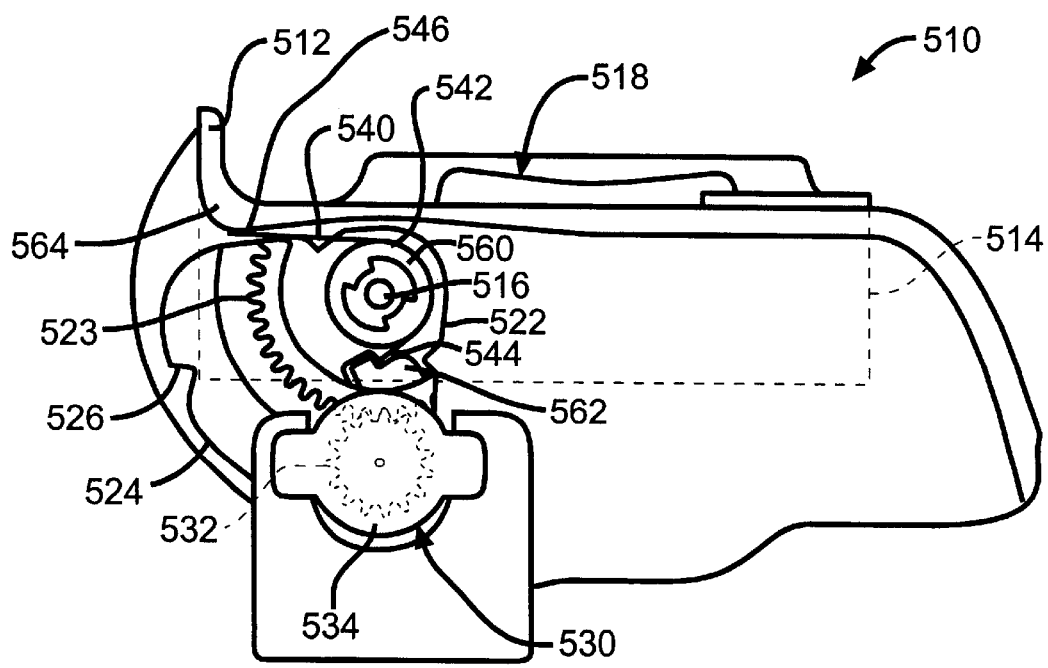
FIG. 25 is an end view of an alternate embodiment of a control panel using the cam of FIG. 24.

There is illustrated in FIG. 25 another alternate embodiment of a control panel indicated generally at 510. The features of the control panel 510 can be used with any of the control panels described and shown herein. The control panel 510 is similar to the control panels 430 and 470 and includes a bezel housing 512 for insertion into a recess of a trim housing, such as an armrest of a door trim panel. The bezel housing 512 includes a recess having a second bank of controls (not shown) mounted therein. The control panel 510 further includes a panel 514 pivotally mounted to the bezel housing about a cylindrical pin 516 extending from the panel 514. The panel 514 includes a first bank of controls 518 mounted thereon.

The panel 514 is movable between a first position, as shown in FIG. 25, and a second position. In the first position, the panel 514 is in a generally horizontal position and is positioned over the second bank of controls. In the second position, the panel 514 is oriented in a generally vertical position to expose the second bank of controls.

The control panel 510 includes a cam 522 which is rotationally fixed relative to the panel 514. The cam 522 is shown enlarged in FIG. 24. Preferably, the cam 522 is mounted on the pin 516. The cam 522 includes a profile or curved cam surface 524 having an arcuate semi-circular shape. The cam surface 524 include an indentation or detent 526 formed therein. Preferably, the control panel 510 includes a detent mechanism (not completely shown) similar to the detent mechanisms 437 and 477 and includes a cam follower for selectively engaging with the cam surface 524 and detent 526 to provide a locking position for the panel 514, as described in detail above.

The cam 522 includes a set of integrally gear teeth 523 arranged in an arcuate path about the axis of the cam 522 corresponding to the pivot axis of the panel 514. The gear teeth 523 engage with a damper mechanism, indicated schematically at 530. The damper mechanism 530 dampens the motion of the panel 514 when moved between its first and second positions. Any suitable damper mechanism may be used. For example, the damper mechanism 530 may include a gear 532 rotatably mounted within a cavity of a housing 534. The housing 534 is fixed relative to the bezel housing 512. The gear 532 is meshingly engaged with the gear teeth 523 of the cam 522. The cavity is filled with a fluid having a desired viscosity. As the gear 532 rotates due to the movement of the cam 522, the fluid within the cavity hinders rotation of the gear 532 within the cavity thereby dampening the movement of the cam 522.

The control panel 510 also preferably includes a spring 540 for biasing the panel 514 to its open/second position, preferably upon actuation of a push button actuated latch mechanism, as described above with respect to the control panel 280 in FIGS. 14 and 15. The spring 540 is preferably a coil spring having a tubular wound center portion 542. The ends of the spring 540 define first and second tangs 544 and 546. The center portion 542 of the spring 540 preferably is disposed about a cylindrical portion 560 integrally formed in the cam 522. As best shown in FIG. 25, the first tang 544 is engaged with a tab 562 extending from the cam 522, and the second tang 546 is engaged with a portion 564 of the bezel housing 512. As shown in FIG. 25, the spring biases the cam 522 in a counter-clockwise direction about the pin 516.

Figure 24:
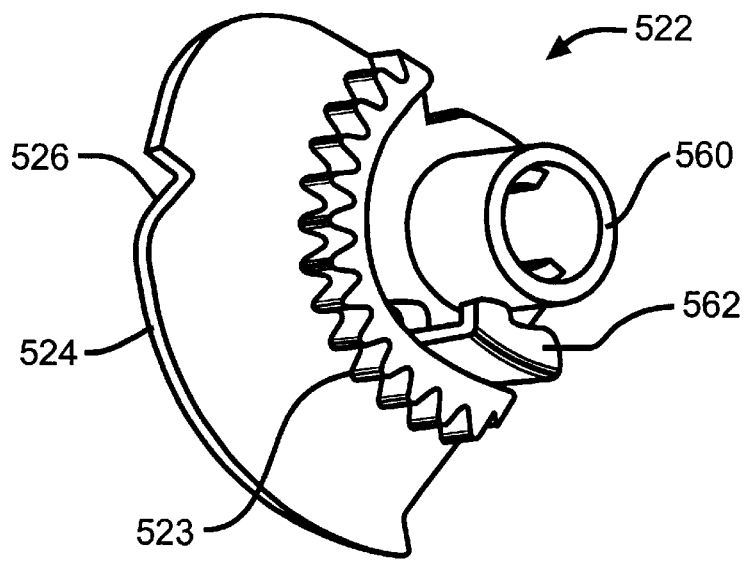
FIG. 24 is an enlarge perspective view of a cam.

An advantage of the cam 522 illustrated in FIG. 24 is that the cam 522 includes integrally formed structures to provide for a detent function, a dampening function, and a spring biased function. More particularly, the cam 522 includes the cam surface 524 and the detent 526 to provide for the detent function, the gear teeth 523 to provide for the dampening function, and the cylindrical portion 560 and tab 562 to provide for a spring biased function.

Figure 26:
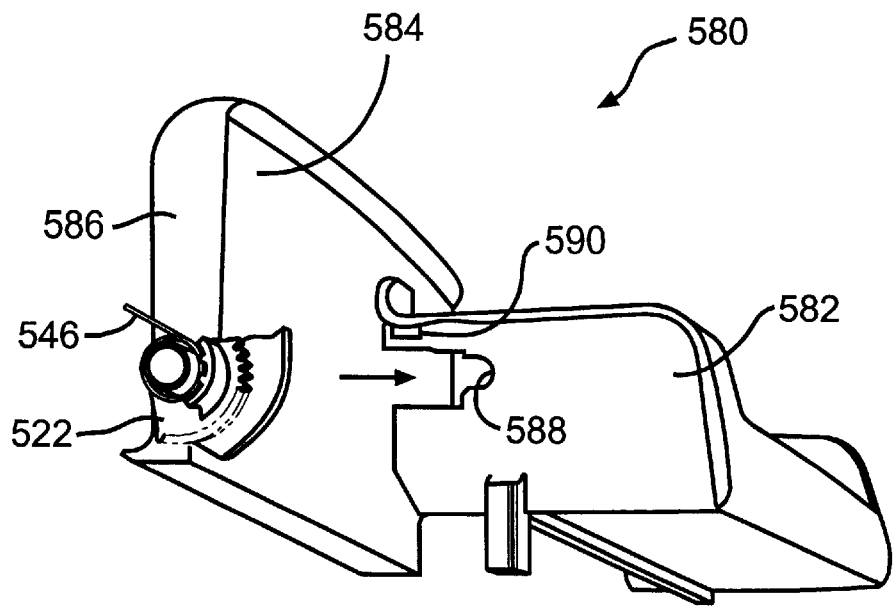
FIG. 26 is an exploded perspective view of an alternate embodiment of a control panel, wherein the bezel housing and the movable panel are shown separately.
Figure 27:
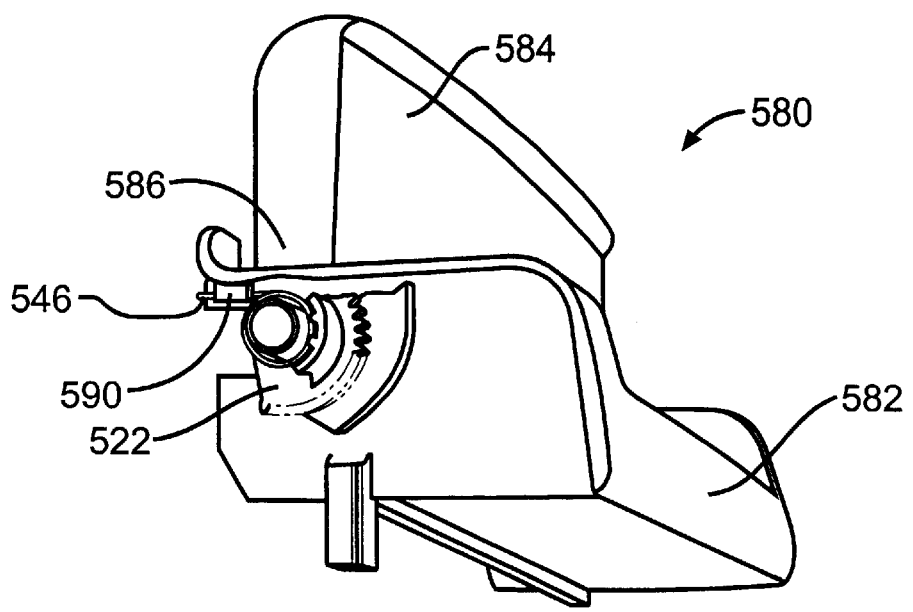
FIG. 27 is a perspective view of the control panel of FIG. 26, wherein the bezel housing and the movable panel are assembled together.

There is illustrated in FIGS. 26 and 27 another alternate embodiment of a control panel indicated generally at 580. The features of the control panel 580 can be used with any of the control panels described and shown herein. The control panel 580 is similar to the control panel 510 illustrated in FIG. 25. The control panel 580 includes a bezel housing 582 for insertion into a recess of a trim housing, such as an armrest of a door trim panel. The bezel housing 582 includes a recess having a second bank of controls (not shown) mounted therein. The control panel 580 further includes a panel 584 pivotally mounted to the bezel housing 582. Preferably, the panel 584 is pivotally mounted to the bezel housing by the insertion of a pin (not shown, but disposed between the cam 522 and an edge 586 of the panel 584) within a slot 588 formed in the bezel housing 582. The panel 584 includes a first bank of controls (not shown) mounted thereon.

The panel 584 preferably includes the cam 522 of FIG. 24. As shown in FIG. 26, the tang 546 of the spring 540 is in its free non-deformed state. Assembly of the panel 584 onto the bezel housing 582 automatically deflects or coils the tang 546 about the cylindrical portion 560 of the cam 522 to a generally horizontal position to place the spring 540 into a loaded position. Note that the bezel housing 582 may include a tab 590 for receiving the tang 546.

Figure 28:
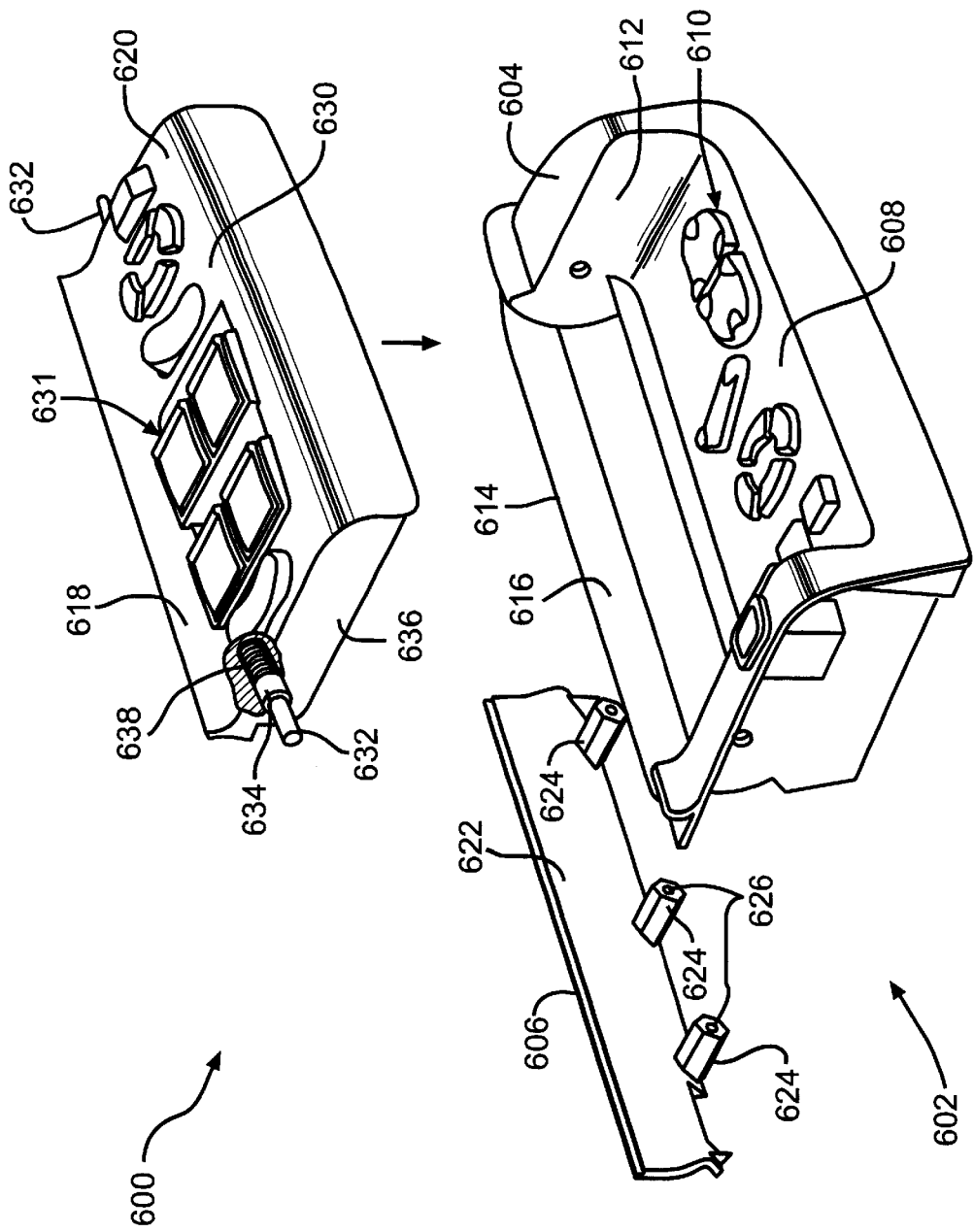
FIG. 28 is an exploded perspective view of an alternate embodiment of a control panel, wherein the two piece bezel housing and the movable panel are shown separately.
Figure 29:
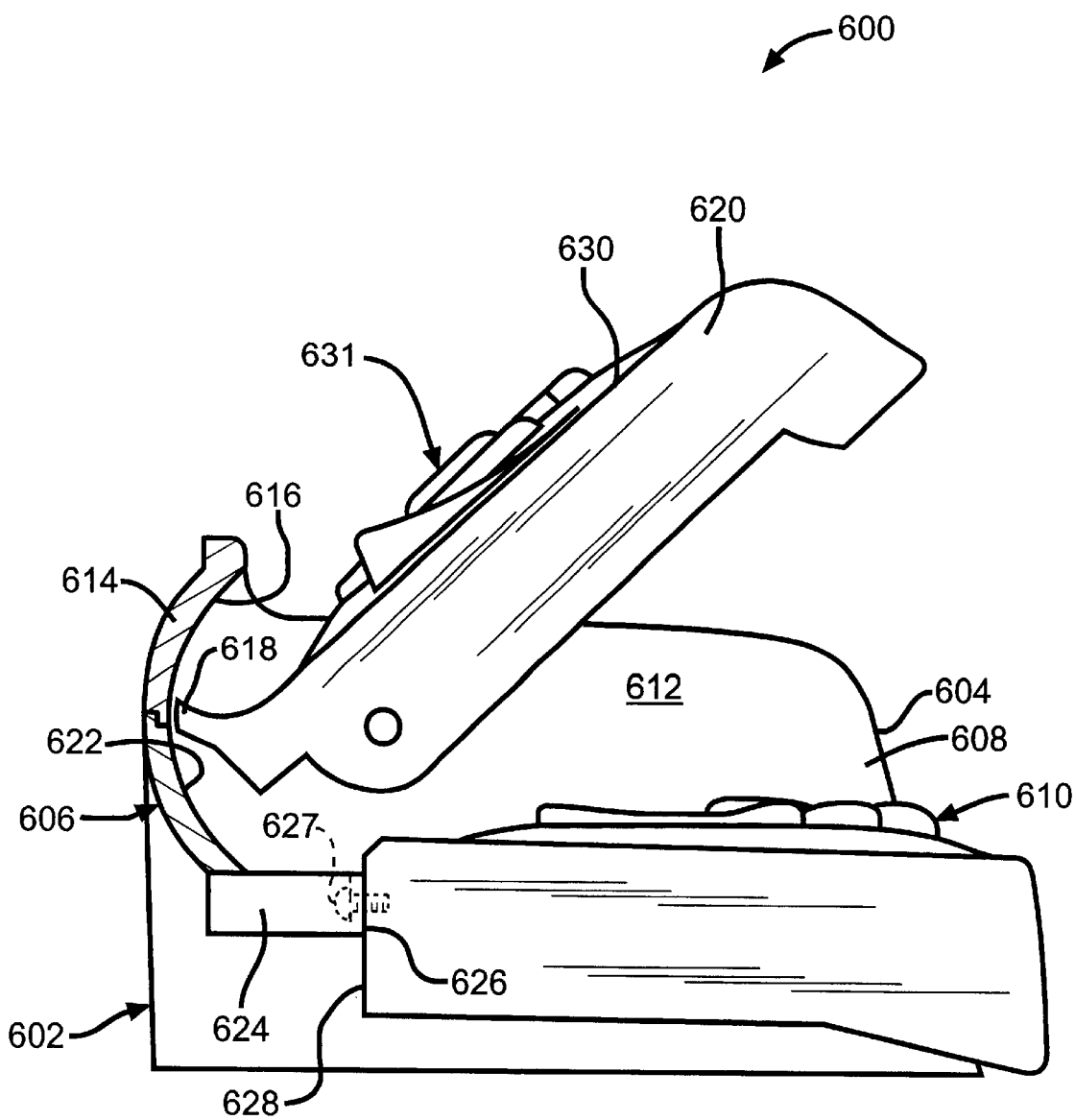
FIG. 29 is an end view in partial cross section of the control panel of FIG. 28.

There is illustrated in FIGS. 28 and 29 another alternate embodiment of a control panel indicated generally at 600. The features and method of assembling the control panel 600 can be used with any of the control panels described and shown herein.

The control panel 600 includes a two piece bezel housing, indicated generally at 602. The bezel 602 can be inserted into a recess of a trim housing, such as an armrest of a door trim panel. The bezel housing 602 includes a main portion 604 and a rear portion 606. The main portion 604 includes a recess 608 formed therein and a second bank of controls 610 mounted therein. The main portion 604 further includes a pair of opposed end walls 612 defining the recess 608. A hole 613 is formed in each of the end walls 612. The main portion 604 also includes a rear edge 614 extending between the end walls 612. As best shown in FIG. 29, the rear edge 614 includes a curved surface 616 for cooperating with a scoop 618 of a panel 620, in a similar function and manner as described above with respect to the control panel 400. The rear portion 606 includes a curved surface 622 which also cooperates with the scoop 618. The rear portion 606 includes bosses 624 extending therefrom to provide mounting locations for attaching the rear portion 606 to the main portion 604. The portions 604 and 606 can be attached with fasteners 627, such as threaded fasteners, for attaching ends 626 of the bosses 624 with an outboard portion 628 of the main portion 604.

The panel 620 includes an upper surface 630 having a first bank of controls 631 mounted thereon. The panel 620 is pivotally mounted to the bezel housing 602 such that the panel is movable between first and second positions, such as described above with respect to the control panel 400. Preferably, the panel includes a pair of pins 632 slidably disposed in a respective bores 634 formed in opposed end walls 636 of the panel 620. Note that the portion of the panel 620 housing the pin 632 is shown partially broken away for clarity in FIG. 28. Preferably, a spring 638 is disposed in each of the bores 634 for biasing the pins 632 outwardly from the end walls 636. The pins 632 are movable to a retracted position completely within the respective bores 634 so that the ends of the pins 632 do not extend past the end walls 636.

To assemble the control panel 600, the rear portion 606 can be first fastened to the main portion 604, as described above. Next, the pins 632 are moved to their retracted positions within the bores 634 of the panel 620. The panel 620 is then positioned between the end walls 612 of the main portion 604 until the pins 632 are aligned with the holes 613 formed in the end walls 612 of the main portion 604. Once aligned with the holes 613, the springs 638 move the pins 632 outwardly from the bores 634 into the holes 613, thereby providing a pivotal connection between the panel 620 and the bezel housing 602, and further providing entrapment of the panel 620 relative to the bezel housing 602. The bezel housing 602 may have already been installed into a recess formed in an armrest or, alternatively, the control panel 600 may be installed as a unit.

Alternatively, the control panel 600 could be assembled by first aligning the panel 620 relative to the end walls 612 of the main portion 604 such that the pins extend into the holes 613, and then subsequently attaching the rear portion 606 to to the main portion 604.

The bezel housing 602 may also be formed of a single piece in which the main portion 604 and the rear portion 606 are integrally formed together.

Figure 30:
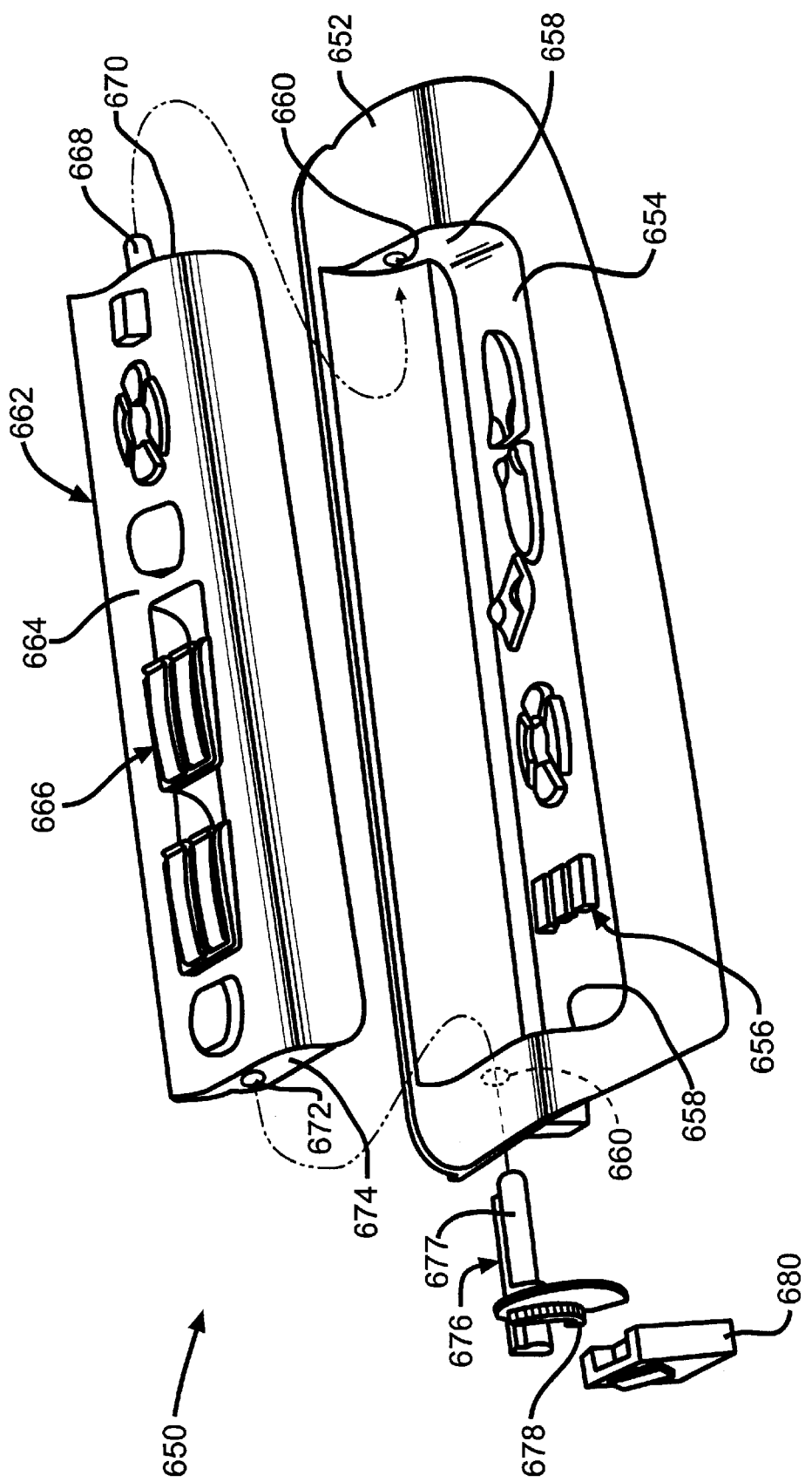
FIG. 30 is an exploded perspective view of an alternate embodiment of a control panel, wherein the bezel housing, the movable panel, and a pin assembly are shown separately.

There is illustrated in FIG. 30 another alternate embodiment of a control panel indicated generally at 650. The features and method of assembling the control panel 650 can be used with any of the control panels described and shown herein.

The control panel 650 includes a bezel housing 652 for insertion into a recess of a trim housing, such as an armrest of a door trim panel. The bezel housing 652 includes a recess 654 formed therein and a second bank of controls 656 mounted therein. The housing 652 further includes a pair of opposed end walls 658 defining the recess 654. Holes 660 are formed in the end walls 658. The housing 652 may also include a rear portion (not shown) similar to the rear portion 606 of the control panel 600.

A panel 662 includes an upper surface 664 having a first bank of controls 666 mounted thereon. The panel 662 is pivotally mounted to the bezel housing 652 such that the panel 662 is movable between first and second positions, such as described above with respect to the control panel 400. The panel 662 preferably includes a single pin 668 extending from an end wall 670. The pin 668 can be stationary or retractable such as the pins 632. The panel 662 includes a bore 672 formed in an end wall 674. The control panel 650 further includes a separate pin or pin assembly 676. The pin assembly 676 includes a pin 677 and can also include a cam 678 similar in function and structure as the cam 522 in FIG. 24. The control panel 650 may further include a damper housing 680 for retaining a damper mechanism 682.

To assembly the control panel 650, the pin 668 is inserted into the respected hole 660 in the end wall 658. Next, the other end of the panel 662 is aligned such that the hole 660 of the end wall 658 is aligned with the bore 672 of the end wall 674 of the panel 662. The pin 677 is inserted through the hole 660 of the end wall 658 and into the bore 672 of the end wall 674 of the panel 662, thereby providing a pivotal connection between the panel 662 and the bezel housing 652, and further providing entrapment of the panel 662 relative to the bezel housing 652. Next, the damper housing 680 can be fastened to the bezel housing 652. The bezel housing 652 may have already been installed into a recess formed in an armrest or, alternatively, the control panel 650 may be installed as a unit.

Figure 31:
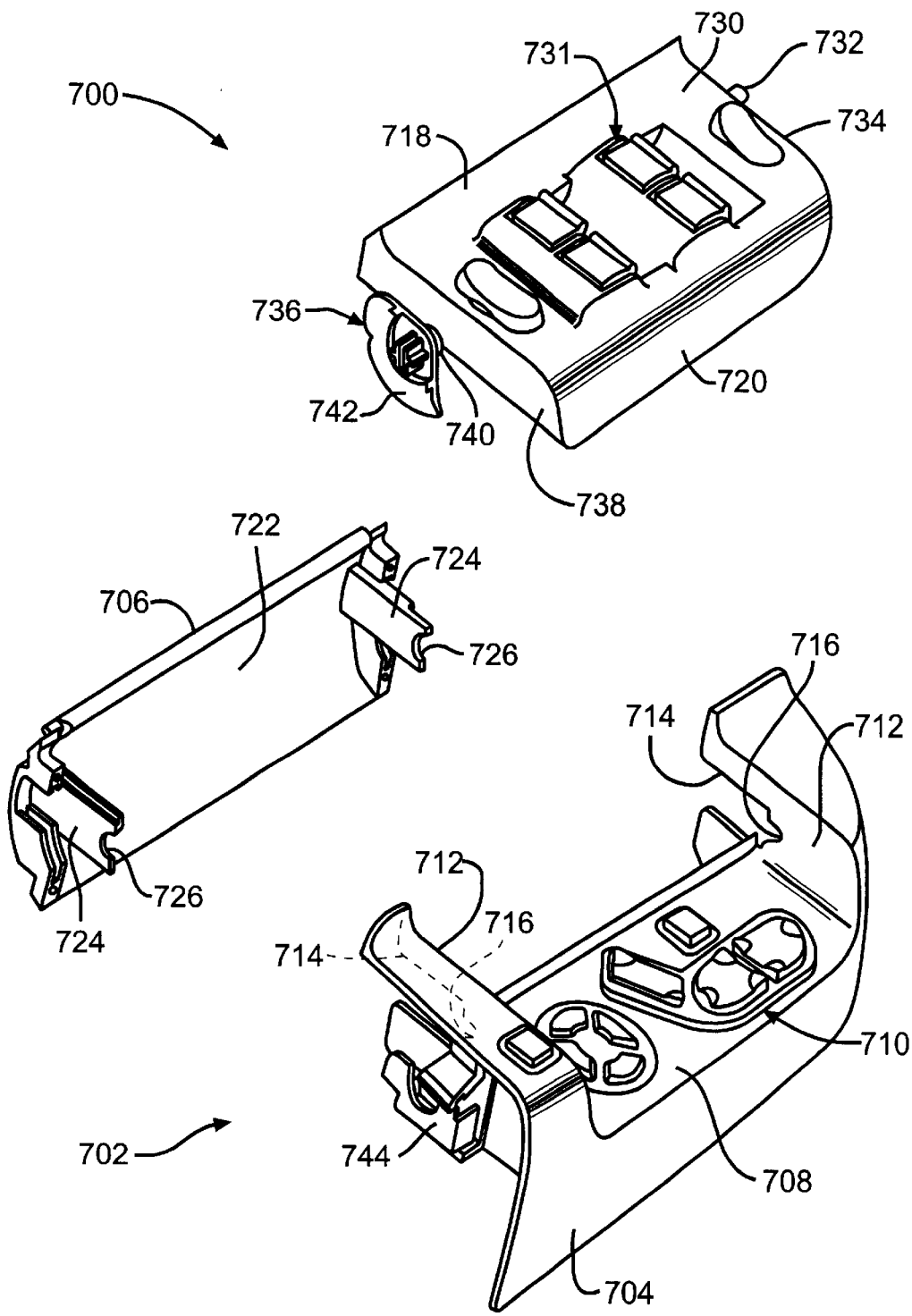
FIG. 31 is an exploded perspective view of an alternate embodiment of a control panel, wherein the two piece bezel housing and the movable panel are shown separately.

There is illustrated in FIG. 31 another alternate embodiment of a control panel indicated generally at 700. The features and method of assembling the control panel 700 can be used with any of the control panels described and shown herein.

The control panel 700 includes a two piece bezel housing, indicated generally at 702. The bezel 702 can be inserted into a recess of a trim housing, such as an armrest of a door trim panel. The bezel housing 702 includes a main portion 704 and a rear portion 706. The main portion 704 includes a recess 708 formed therein and a second bank of controls 710 mounted therein. The main portion 704 further includes a pair of opposed end walls 712 defining the recess 708. The main portion further includes a pair of slots 714 formed in the end walls 712. The ends of the slots 714 preferably includes a semi-circular notch 716 formed therein.

The rear portion 706 includes a curved surface 722 for cooperating with a scoop 718 of a panel 720, in a similar function and manner as described above with respect to the control panel 400. The rear portion 706 includes tabs 724 extending therefrom. The ends of the tabs 724 preferably include semi-circular notches 726 formed therein.

The panel 720 includes an upper surface 730 having a first bank of controls 731 mounted thereon. The panel 720 is pivotally mounted to the bezel housing 702 such that the panel 720 is movable between first and second positions, such as described above with respect to the control panel 400. Preferably, the panel includes a pin 732 extend from an end wall 734 thereof. A pin assembly 736 extends from an opposite end wall 738. The pin assembly 736 preferably includes a pin 740 and can also include a cam 742 similar in function and structure as the cam 522 in FIG. 24. The pin 740 is disposed between the cam 742 and the end wall 738 of the panel 720. The pin assembly 736 can be integrally formed with the panel 720. The bezel housing 702 may further include a damper housing 744 for retaining a damper mechanism (not shown).

To assemble the control panel 700, the panel is 720 aligned with the main portion 704 such that the pins 732 and 740 are disposed in the semi-circular notches 716 of the slots 714 of the main portion 704. Next, the rear portion 706 is aligned with the main portion 704 and the panel 720 such that the semi-circular notches 726 of the tabs 724 are disposed about the pins 732 and 740. The notches 716 and 726 combine to form a hole for retaining the respective pins 732 and 740. The main portion 704 and the rear portion 706 can then be attached together, such as by threaded fasteners (not shown).

Figure 32:
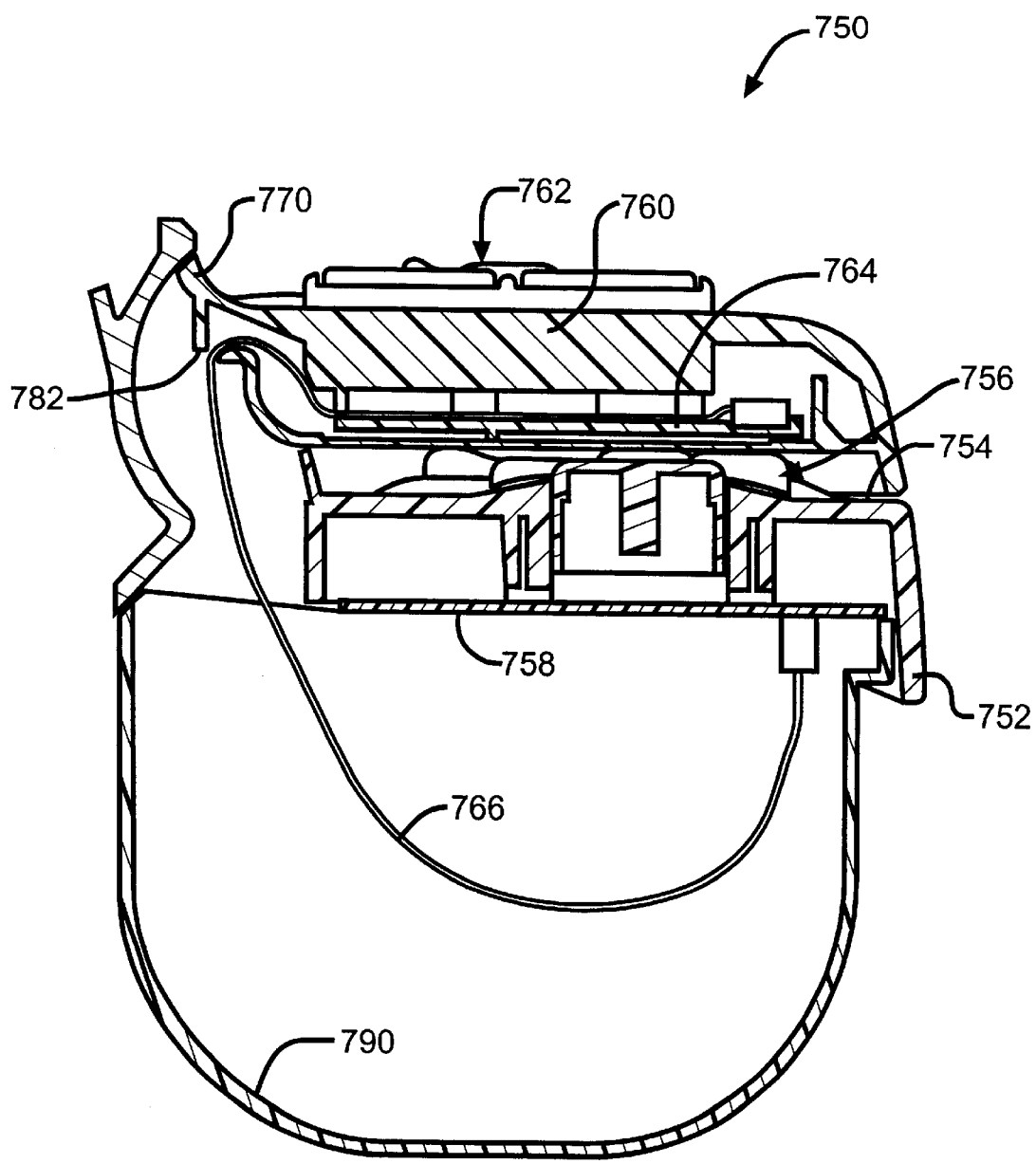
FIG. 32 is an end cross sectional view of an alternate embodiment of a control panel.

There is illustrated in FIG. 32 another alternate embodiment of a control panel indicated generally at 750. The control panel 750 can include any of the features of the various control panels described herein, and preferably includes a plurality of controls for controlling various electrical components or accessories of the vehicle, such as seats, mirrors, windows, door locks, pedal adjustment mechanisms, and steering column adjustment mechanisms. The control panel 750 is similar to the control panel 430 illustrated in FIG. 22 and includes a bezel housing 752 for insertion into a recess of a trim housing, such as an armrest of a door trim panel. The bezel housing 752 includes a recess 754 having a second bank of controls 756 mounted therein. The second bank of controls 756 can be electrically connected to a printed circuit board 758. The control panel 750 further includes a panel 760 pivotally mounted to the bezel housing 752 in similar manners as the control panels described above. The panel 760 includes a first bank of controls 762 mounted thereon. The first bank of controls 762 can be electrically connected to a printed circuit board 764. Preferably, the controls or printed circuit boards 758 and 764 are electrically connected together by a flexible wire 766, such as by a multiplex bus wiring scheme or using a direct connection. Of course, the controls can be wired by any suitable manner.

The panel 760 preferably includes a scoop portion 770. It is preferred that the flexible wire 766 is directed below the scoop portion 770. The panel 760 includes a slot 782 formed therein adjacent to and underneath the scoop portion 770 and extending between the printed circuit board 758 or a direct connection to one or more of the first bank of controls. The flexible wire 766 is directed through the slot 782. As the scoop portion 770 rotates, the portion of the wire 766 extending through the slot 782 also moves therewith, thereby preventing being caught between the scoop cooperation and a cooperating curved surface 786 of the bezel housing. Preferably, the bezel housing includes a trough 790 formed therein located underneath the scoop potion 770 and the slot 782. The flexible wire 766 is disposed in the trough. The hollow interior of the trough 790 permits the wire 766 to translate or move therein during movement of the panel 760. The trough 790 covers the wire harness and prevents the wire harness from being caught on any components or caught on objects during shipment or installation within the vehicle.

Figure 33:
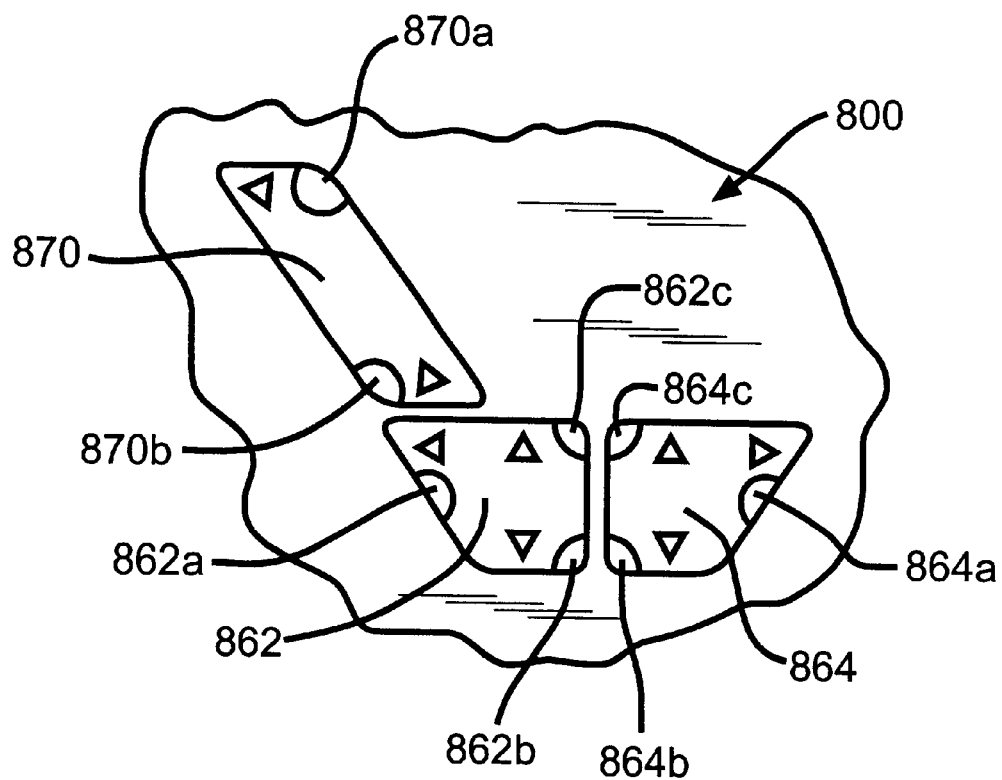
FIG. 33 is a top plan view of a seat control switch assembly.
Figure 34:
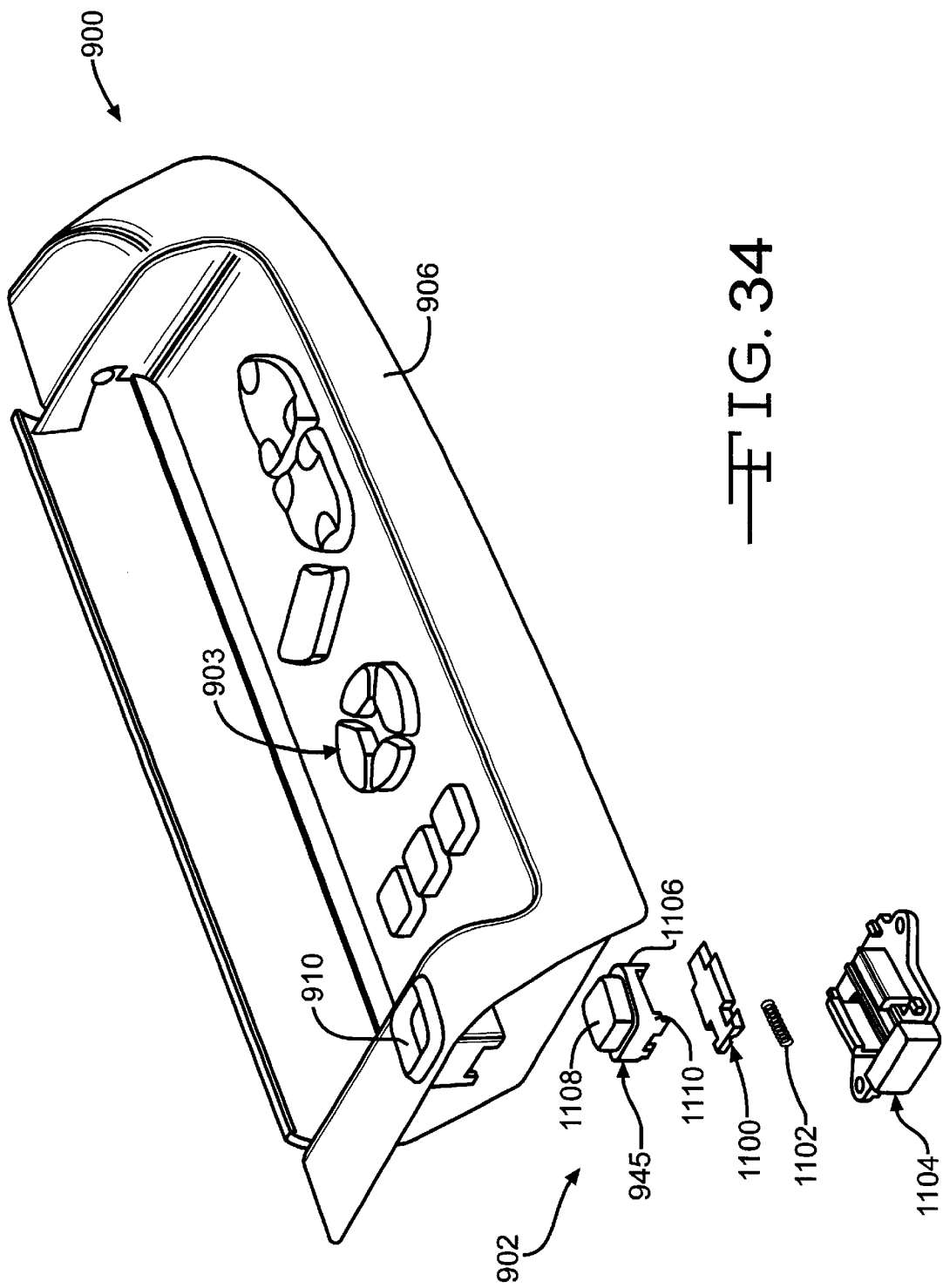
FIG. 34 is an exploded perspective view of an alternate embodiment of a control panel having a latch release mechanism.

There is illustrated in FIG. 33 a seat recliner switch assembly, indicated generally at 800. The switch assembly 800 is similar to the switch 74 of the control panel 10 and controls the operation of seat control mechanisms. Generally, the switch assembly 800 provides convenient operation of a six-way powered seat (fore, aft, and height adjustment) even if the switch assembly 800 is mounted and/or used on a horizontal plane. In a six-way powered seat, a front portion of the seat bottom is movable in an upward and downward direction. Likewise, the rear portion of the seat bottom is movable in an upward and downward direction. The seat bottom is also movable in the fore and aft directions. When mounted on a horizontal plane, seat controls are less intuitive because of the orientation of the seat does not coincide with the orientation of the controls.

The switch assembly 800 includes a rear switch 862 and a front switch 864 for controlling the fore, aft, and height adjustments of a six-way powered seat. AS shown in FIG. 33, the switches are preferably trapezoidal in shape to generally correspond to the shape of a seat bottom. Of course, the switches 862 and 864 can have any suitable shape, such as triangular in shape. Each of the switches 862 and 864 include three operating positions by depression of portions, 862a, 862b, 862c, and 864a, 864b, and 864c, downwardly. The portions can include raised or indented tabs for tactile feedback. Depression of the portion of the switch 862a moves the seat in an aft position. Depression of the portion of the switch 864a moves the seat in a fore position. Depression of the portion of the switch 862b moves the rear portion of the seat in a downward position. Depression of the portion of the switch 864b moves the front portion of the seat in a downward position. Depression of the portion of the switch 862c moves the rear portion of the seat in an upward position. Depression of the portion of the switch 864c moves the front portion of the seat in an upward position.

Conventional power seat switches typically combine the switches 862 and 864 into a single housing which is mounted on the seat in a generally vertical orientation similar to the actual orientation of the seat. However, movement of the switch in a horizontal sideways manner on the armrest might be confusing to a user. Therefore, it is preferable that the portions 862b and 864b are located adjacent one another to permit the operator to simultaneously depress both the portions 862b and 864b with one finger. Similarly, it is preferable that the portions of the switches 862c and 864c be adjacent one another. As can be seen in FIG. 33, this arrangement corresponds to having a side 870 of the switch 862 and a side 872 of the switch 864 adjacent one another, wherein in the portions of the switches controlling the vertical movement of the seat are positioned on the sides 870 and 872.

The switch assembly 800 may also include a switch 870 having two operating positions corresponding to portions 870a and 870b of the switch 870. Depression of the portion of the switch 870a reclines the seat back rearward. Depression of the portion of the switch 870b reclines the seat back forward.

Figure 35:
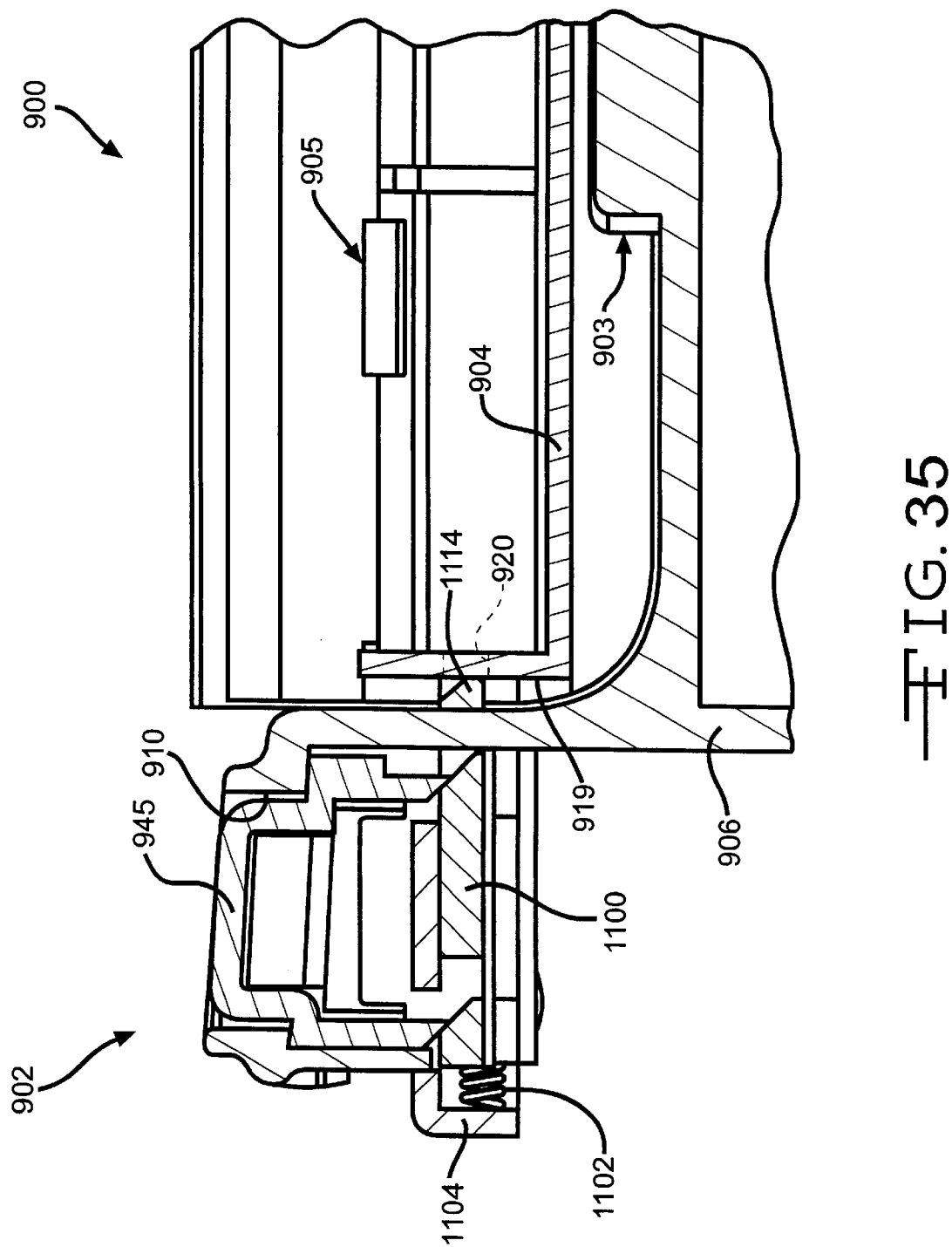
FIG. 35 is an enlarged cross sectional view of the latch release mechanism of FIG. 34.

There is illustrated in FIGS. 35 through 39, an alternate embodiment of a control panel 900 having a latch mechanism, indicated generally at 902, for locking a movable door panel 904 relative to a bezel housing 906. The door panel 904 includes a first bank of controls 903. The bezel housing 906 includes a second bank of controls 903. The panel 904 is similar to the panels described and movable between a first/closed position, as shown in FIG. 35, and a second open position. Generally, an actuating member, such as a button 945, operates the latch mechanism 902 and allows the panel 904 to move from its closed and locked position, for example as shown in FIG. 2, into an open position, as shown in FIG. 3. Preferably, the control panel 900 includes a spring (not shown) similar to the spring for biasing the panel 904 to its open position. The button 945 is disposed in a recess 910 formed in the bezel housing 906.

The latch mechanism preferably includes a button, indicated generally at 945, a latch cam member, indicated generally at 1100, a latch cam spring 1102 and a latch cam base, indicated generally at 1104. The structure and operation of each will be described in greater detail below.

Illustrated in FIGS. 36a through 36d is the button 945, shown having a generally square body 1106. However, the button 945 can have any suitable shape such as rectangular, round, triangular or ovate. The upper surface 1108 of the button 945 is preferably shaped similarly to the body 1106 and when used is depressed by the user. It is anticipated that the button 945 will be made entirely of a single type of material, however, the upper surface 1108, can be made of a softer material, such as fabric, or a gel- or foam-filled plastic, for the comfort of the user. The lower surface of the button has at least one leg 1110, and preferably a plurality of legs, extending therefrom. It is preferred that the legs 1110 be positioned about the body 1106 of the button 945 equally. Particularly, with the illustrated square button 945 for example, the four legs 1110 are positioned at the four corners of the body 1106. In alternate embodiments using differently shaped buttons, the legs are preferably equally spaced about the perimeter of the body. The lower portion of each leg 1110 of the button 945 has a first cam portion 1112 formed thereon. Each cam portion 1112 has an inclined or angled surface. It is preferred that the angle be approximately forty-five degrees in order to translate the downward force, when the button is pushed, to a lateral force that moves the latch cam member 1100. However, it can be appreciate that if the direction the latch cam 1100 is to be moved is other than ninety degrees, the angle of the cam portion 1112 can be changed to provide the desired amount and direction of force. The first cam portions 1112 of the button are adapted to cooperate with the second cam portions 1116 formed on the latch cam member 1100.

Now referring to FIGS. 37a through 37f, the latch cam member 1100 is shown as a generally rectangular body 1115 having a tab 1114 extending therefrom and at least one second cam portion 1116. The latch cam preferably has a plurality of second cam portions 1116 that correspond to the first cam portions 1112. The second cam portions 1116 are spaced around the perimeter of the latch cam member 1100 such that the second cam portions 1116 are aligned with the legs 1110 of the button 945. Each cam portion 1116 preferably has an inclined or angled surface. It is also preferred that the angle be approximately forty-five degrees in order to translate the downward force when the button is pushed, to a lateral force that moves the latch cam member 1100 horizontally. However, if the direction the latch cam 1100 is to be moved is other than ninety degrees from the force angle, the angle of the cam portions can be changed to provide the desired amount and direction of force. The second cam portions 1116 of the latch cam 1100 are adapted to cooperate with the first cam portions 1112 formed on the legs 1110 of the button 945. The latch cam member 1100 also has a tab cam portion 1118, formed on the tab 1114, extending from the body 1115 of the latch cam member 1100. The tab cam portion 1118 is generally in contact with an end wall 919 of the panel 904 when the panel 904 is being moved to its closed position. As is best shown in FIGS. 37e and 37f, the latch cam member 1100 also includes a notch 1120 which receives the latch cam spring 1102. The housing of the spring 1102 in the notch 1120 and in a notch 1131 of the latch cam base 1104 provides a relatively short latch mechanism. The generally horizontal spring 1102 biases the latch cam member 1100 into a first outwardly position. When the panel 904 is being closed, the panel 904 contacts the tab cam 1118 of the latch cam member 1100 and pushes the member against the biasing spring 1102 such that the latch cam member 1100 moves in the opposite direction of the spring bias. In the first position, the tab 1114 lockingly engages panel 904 by being disposed in a slot 920, as will described below.

The button 945, the latch cam portion 1100 and the spring 1102 are preferably supported relative to the bezel housing 906 by the latch cam base 1104. The base 1104, shown in FIGS. 38a through 38e, is assembled with the button 945, latch cam member 100 and spring 102 in the positions generally described above, and secured therewith. The base 1104 includes a generally flat body 1122 having a pair of oppositely spaced flanges 1124 extending generally perpendicularly therefrom, preferably adapted to receive and support the body 1115 of the latch cam member 1100. Between the flanges 1124, are a pair of generally parallel, spaced apart tracks 1126 within which the latch cam member 1100 can move. A portion of the latch cam member 1100 is further received within a latch stop 1128 positioned at the back of the support 1104. The latch stop 1128 is positioned generally perpendicularly to the flanges 1124 and track 1126 and has an outer wall 1130 and a gap 1132 for receiving the end of the spring 1102. When the panel 904 is in the closed and latched position, the spring 1102 biases the latch cam member 1100 in a first position. When the button 945 is depressed, the latch cam member 1100 moves in a second direction thereby compressing the spring 1102 against the latch stop 1128.

Positioned at oppositely spaced positions on the body 1122 of the latch cam base 1104 are connector flanges 1134 formed with the body 1122 of the base 1104. The connector flanges extend generally within the same plane as the body 1122 and have a hole 1136 formed therethrough. The holes 1136 are preferably adapted to receive threaded fasteners 1138 that can be used to connect the base 1104 and the intervening parts with the bezel housing 906. Although threaded fasteners 1138 are used in the Figures for showing how the base 1104 is connected to the bezel housing 906, it can be appreciated that any suitable method for attaching the base to the housing can be used.

Figure 39A:
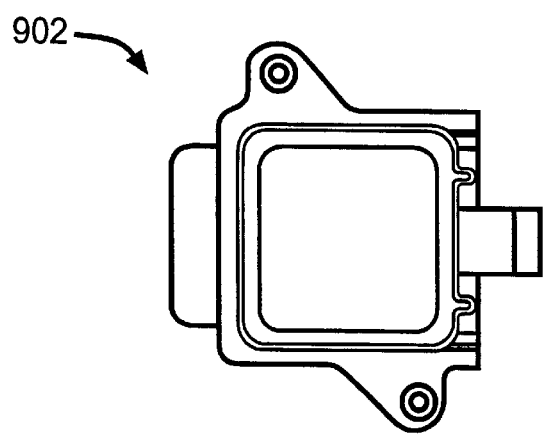
FIGS. 39a through 39c are, respectively, plan, side elevation, and front elevation views of the latch release mechanism assembly of FIG. 34.
Figure 39B:
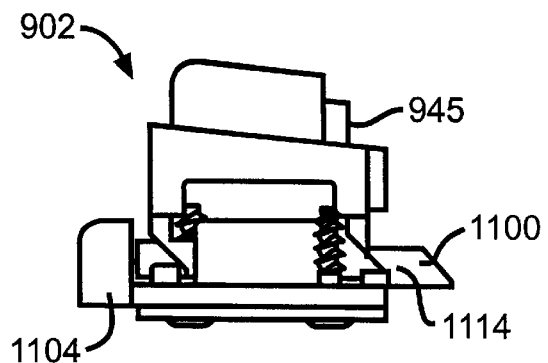
Figure 39C:
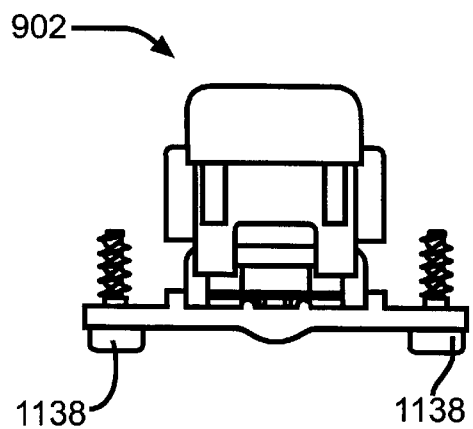

Illustrated in FIGS. 39a through 39c is the assembled button and latch assembly. In FIG. 39b, it can be seen how the first cam portions 1112 and second cam portions 1116 cooperate to move the latch in a first and second direction from a respective first position to a second position. In the first position, the tab 1114 of the latch cam member 1100 locks the panel 904 relative to the bezel housing 906. Therefore, the panel 904 includes a gap or slot 920 for receiving the tab 1114 of the latch cam 1100. The second cam portions 1116 of the latch cam member 1100 preferably also have an engaging surface that is shaped to correspond with the shape of the first cam portion 1112 engaging surface. For example, the first cam portion 1112 has a generally flat, angled or sloped surface and the second cam portion 1116 has a generally flat surface positioned at generally the same angle or slope. When the button is depressed the first cam portion 1112 engaging surface engages the second cam portion 1116 engaging surface. The further the button 945 is pressed, the more the latch cam member 1100 moves in a direction counter the angle of the cam portion surfaces. In the second position, the tab 1114 will disengage the panel 904 thereby allowing the panel 904 to be moved upwardly relative to the bezel housing 906, as described above. As also described above, the end of the tab 1114 also has a cam portion 1118 that engages a portion of the end wall 919 of the panel 904 when the panel 904 is returned to a closed position. The portion of the end wall 919 temporarily engages the cam portion 1118 of the tab 1114 thereby moving the latch cam member 1100 in a direction against the biasing force of the spring 1102. When the panel 904 is moved beyond a certain point, the spring biased latch cam member 1100, and more specifically the tab 1114, moves into engagement with the slot 920 of the panel 904. This locks the tab 1114 with the panel 904 thereby preventing inadvertent movement of the panel 904.

It should be understood that the various features of different embodiments may be used as shown with the specific embodiments illustrated or with other features shown and described with other control panels arrangements. Thus, a control panel can be configured with one or more of the features as disclosed herein. It should also be understood that the trim panels or housings to which the control panels are mounted can be any suitable trim component in the vehicle, such as door panels, armrests, instrument panels, center consoles, seats, overhead consoles, and roofs.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A control panel for a vehicle comprising:

a housing having a recess and a trough formed therein, said trough having an arcuate surface;

a panel pivotally attached to said housing, said panel movable between a first position, wherein said panel generally covers a portion of said recess, and a second position wherein said panel generally exposes said recess;

said panel including an arm extending from said panel and extending in said trough, said arm having an end positioned adjacent said arcuate surface such that movement of said panel between said first and second positions moves said arm over said arcuate surface; and a first control mechanism mounted on said panel.

2. The control panel of claim 1, wherein said arm is integral with said panel.

3. The control panel of claim 1, wherein said arm includes a curved surface functioning as a scoop to help prevent debris from collecting in said trough.

4. The control panel of claim 3, wherein said arcuate surface is preferably cylindrically shaped defined by a radius originating from the pivot axis of said panel pivotally mounted on said housing.

5. The control panel of claim 1, wherein said end of said arm is in sliding contact with said arcuate surface.

6. The control panel of claim 1, wherein said end of said arm is spaced from said arcuate surface.

7. The control panel of claim 6, wherein said end of said arm is spaced from said arcuate surface by less than 3 mm.

8. The control panel of claim 1, wherein said control panel includes a second control mechanism mounted on a surface defining said recess.

9. The control panel of claim 1, wherein said housing is mounted in an armrest of a vehicle door panel.

10. The control panel of claim 1, wherein said panel has opposed first and second sides, and wherein said first control mechanism is mounted on one of said first and second sides and a second control mechanism is mounted on the other of said first and second sides.

11. The control panel of claim 1, said panel defines a first panel, said control panel further including a second panel movably mounted within said recess between a raised and a lowered position.

* * * * *